United States Patent [19]

Rountree et al.

[11] Patent Number: 5,568,449

[45] Date of Patent: Oct. 22, 1996

[54] METHODS AND APPARATUS FOR USE IN ULTRASONIC RANGING

[75] Inventors: Steven P. Rountree; Samir W. Berjaoui, both of Lafayette, La.

[73] Assignee: U.S. Test, Inc., Lafayette, La.

[21] Appl. No.: 307,292

[22] Filed: Sep. 2, 1994

[51] Int. Cl.$^6$ .................................... G01S 15/42
[52] U.S. Cl. ........................ 367/99; 367/908; 367/902; 73/290 V; 73/40.5 A
[58] Field of Search .................... 367/99, 908, 902; 73/290 V, 40.5 A, 40; 340/621

[56] References Cited

U.S. PATENT DOCUMENTS

| | | | |
|---|---|---|---|
| 3,113,456 | 12/1963 | Smith, Jr. et al. | 73/290 R |
| 3,184,969 | 5/1965 | Bolton | 73/290 V |
| 3,214,974 | 11/1965 | Altman et al. | 73/290 V |
| 3,394,589 | 7/1968 | Tomioka | 73/290 V |
| 3,520,186 | 7/1970 | Adams et al. | 73/290 R |
| 3,693,445 | 9/1972 | Johnson | 73/290 V |
| 3,745,829 | 7/1973 | Franchi | 73/290 V |
| 3,985,030 | 10/1976 | Charlton | 73/290 V |
| 4,063,457 | 12/1977 | Zekulin et al. | 73/290 V |
| 4,084,582 | 4/1978 | Nigam | 367/151 |
| 4,090,407 | 5/1978 | Shuler et al. | 73/290 V |
| 4,130,018 | 12/1978 | Adams et al. | 73/290 V |
| 4,158,964 | 6/1979 | McCrea et al. | 73/290 V |
| 4,161,715 | 7/1979 | Harris | 367/107 |
| 4,170,765 | 10/1979 | Austin et al. | 367/100 |
| 4,203,324 | 5/1980 | Baumoel | 73/290 V |
| 4,210,969 | 7/1980 | Massa | 367/108 |
| 4,221,004 | 9/1980 | Combs et al. | 367/114 |
| 4,229,798 | 10/1980 | Rosie et al. | 364/564 |
| 4,236,144 | 11/1980 | Sunagawa | 340/870.18 |
| 4,241,432 | 12/1980 | Barber et al. | 367/151 |
| 4,320,659 | 3/1982 | Lynnworth et al. | 73/589 |
| 4,337,656 | 7/1982 | Rapp | 73/290 V |
| 4,361,037 | 11/1982 | Hauschild et al. | 73/295 |
| 4,470,299 | 9/1984 | Soltz | 73/290 V |
| 4,531,406 | 7/1985 | Fritz | 73/290 V |
| 4,578,997 | 4/1986 | Soltz | 73/290 V |
| 4,748,846 | 6/1988 | Haynes | 73/290 V |
| 4,805,453 | 2/1989 | Haynes | 73/292 |
| 4,811,601 | 3/1989 | Tolan | 73/290 V |
| 4,984,449 | 1/1991 | Caldwell et al. | 73/49.2 |
| 5,301,549 | 4/1994 | Sinclair | 367/908 |

FOREIGN PATENT DOCUMENTS 149640  12/1961  U.S.S.R. .

OTHER PUBLICATIONS

Lynnworth L. C., and Patch, D. R., "New Sensors for Ultrasound: Measuring Temperature Profiles," *Materials Research and Standards*, Aug. 1970, 6–11. Figure 4 on p. 10 discloses propagating ultrasonic waves across multiple reflectors in a fluid media.

Barone, A., "Generation, Detection and Measurement of Ultrasound," In *Encyclopedia of Physics*, edited by S. Flugge, 150–51. Berlin: Springer–Verlag, 1962. Discloses propagating an ultrasonic pulse from a transducer through a liquid media to a reflector (see figure 98 on p. 150).

McSkimin, H. J., "Ultrasonic Methods for Measuring the Mechanical Properties of Liquids and Solids," In *Physical Acoustics Principles and Methods*, edited by Warren P. Mason, 272–321. New York: Academic Press, 1964. This reference is substantially cumulative to the above Barone reference.

Lynnworth, Lawrence A., "Industrial Applications of Ultrasound—A Review, II. Measurements, Tests, and Process Control Using Low–Intensity Ultrasound," *IEE Transactions on Sonics and Ultrasonics* SU–22 (1), (Mar. 1975): 71–101.

Josef Krautkramer and Herbert Krautkramer, *Ultrasonic Testing of Materials*, (Springer–Verlag, Berlin, Heidelberg, New York, 1977) These two references are substantially cumulative to the above cited Russian Patent No. 149,640.

Vista Research, Inc., *Evaluation of Volumetric Leak Detection Methods for Underground Fuel Storage Tanks*, vol. 2. Technical Appendices (U.S. Department of Commerce, Nov. 1988) Part 1 of 2.

Lynnworth, L. C., Papadakis, E. P., Patch, D. R., Fowler, K. A., and Shepard, R. L., "Nuclear Reactor Applications of New Ultrasonic Transducers," *IEEE Transactions on Nuclear Science* NS–18 (1), (Feb. 1971): 351–62. P. 10 discloses a temperature compensated level gage in a tank of liquid. A transducer is positioned at the bottom of the tank and multiple reflectors are positioned along the one side of the tank (see figure 13(k)). Figures 13(i) and 13(j) also disclose stepped reflectors.

Julian R. Frederick, *Ultrasonic Engineering*, (New York: John Wiley & Sons, 1965), 210–13. Figure 6.7 on p. 213 discloses a liquid container with two stillwells positioned therein. One stillwell has a plurality of reflectors positioned therein and both stillwells have transducers positioned below them.

Ellis M. Zacharias, Jr., NUSonics, Inc. and Donald. W. Franz, HBH Associates, Inc., "Sound Velocimeters Monitor Process Streams," (reprinted from *Chemical Engineering*, Jan. 22, 1973, McGraw–Hill, Inc., vol. 80, No. 2) 101–108. Figure 3 on p. 104 discloses a transducer positioned on a plate a reflector positioned a given distance from the transducer. A resistance thermometer is positioned on the plate adjacent to the transducer/reflector assembly. The plate will be positioned such that the transducer/reflector and thermometer are in a liquid.

Ellis M. Zacharias, Jr., NUSonics, Inc., "Sonic detectors see gasoline interfaces," (*Oil & Gas Journal*, reprinted from the Aug. 21, 1972 edition).

E. M. Zacharias, Jr. and R. Ord, Jr., "Developments broaden use of sonic pipeline interface detectors," (*Technology, Oil & Gas Journal*, Nov. 30, 1981) 80–82, 87–89.

Ellis M. Zacharias, Jr., NUS Corporation, "Process Measurements by Sound Velocimetry," (Sep. 1970—*Instruments and Control Systems*, vol. 43, No. 9).

Mary M. Hoyt, "Development in Sonic Interface Detection," (*ISA Transactions*, vol. 18, No. 1, 1979) 15–21. These four references are substantially cumulative to the above cited article in *Chemical Engineering*, Jan. 22, 1973, vol. 80, No. 2, pp. 101–108.

O. I. Babikov, *Ultrasonics and its Industrial Applications*, (Consultants Bureau, New York, 1960) translated from Russian. Figures 96 and 97 on p. 150 disclose a transducer probe assembly. Figure 96 is a cross sectional view showing a piezoelectric crystal positioned in the probe assembly.

L. C. Lynnworth and E. H. Carnevale, Panametrics, Inc., *Ultrasonic Thermometry Using Pulse Techniques*, (Presented at the Fifth Symposium on Temperature, Washington, D.C., Jun. 21–24, 1971, Copyright 1972, Instrument Society of America). Figure 8 on p. 723 illustrates a transducer positioned at the top of a tank of liquid and directing an ultrasonic pulse toward a stepped reflector position at the bottom of the tank.

Advertising brochure produced by Red Jacket Electronics, one page of which illustrates a probe with a transducer and reflector rings. The probe is shown position in a tank with the transducer below the liquid surface.

Advertising brochure produced by Buffalo Environmental Products of Baltimore, Maryland.

Adverstising brochure produced by Tidel Engineering, Inc. of Carrolton, Texas. Both the Buffalo Environmental and the Tidel Engineering brochures are substantially cumulative to the Red Jacket Electronics brochure.

*Primary Examiner*—Daniel T. Pihulic
*Attorney, Agent, or Firm*—Roy, Kiesel & Tucker

[57] ABSTRACT

An ultrasonic probe utilized in an ultrasonic ranging system for determining fluid volume and/or fluid leakage in an underground storage tank, as well as monitoring fluid inventory, is provided which is characterized by (i) having its calibration reflectors positioned whereby each of the secondary echo packets formed by the calibration reflectors of the ultrasonic probe becomes imbedded into the trailing edge of a primary echo packet of another calibration reflector or to cause its secondary echo packet to be detected by the transducer after the transducer has detected a primary echo packet associated with the fluid surface, (ii) each of the calibration reflectors being positioned perpendicular to and offset from the longitudinal axis of the probe body, (iii) an ultrasonic sound wave dampening member fixedly positioned in the probe body between the transducer assembly and the tank bottom, the wave dampening member having a surface facing toward the transducer assembly wherein the surface is configured to dampen sound waves striking the surface before the sound waves are reflected from the surface, or (iv) the transducer assembly comprising a transducer body in which is housed a piezoelectric crystal oriented perpendicular to the longitudinal axis of the prove body, wherein the transducer body is structured to dampen selected ultrasonic sound waves which emanate from the crystal.

22 Claims, 16 Drawing Sheets

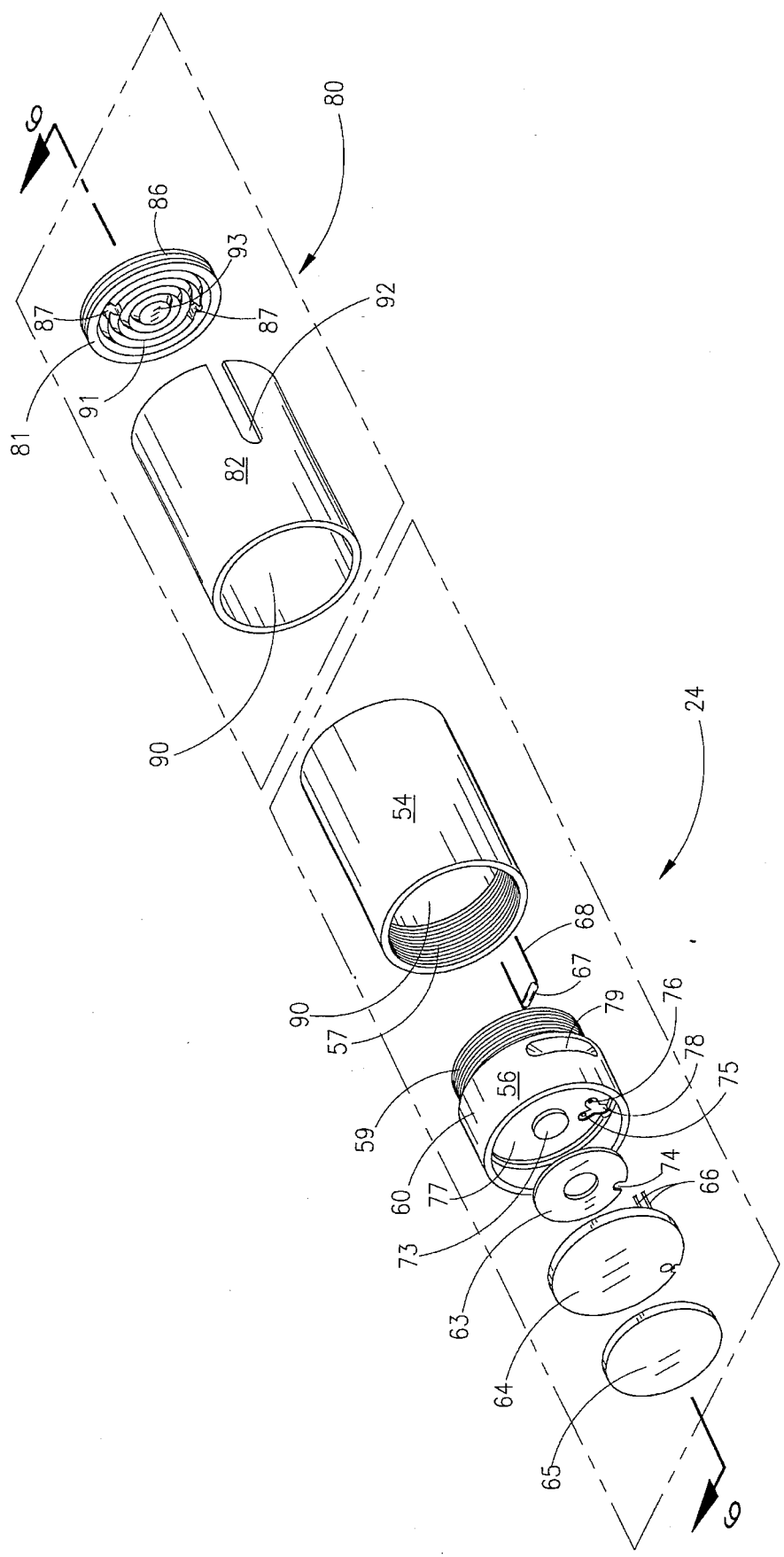

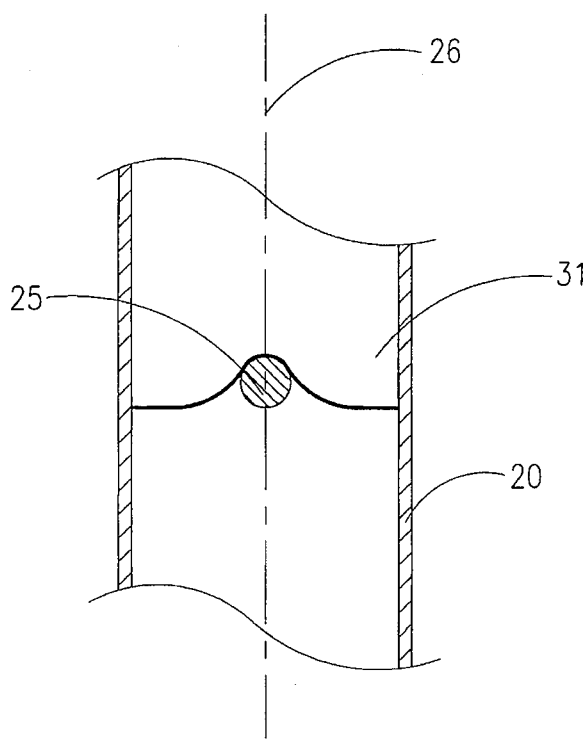
_Fig. 7_
(PRIOR ART)
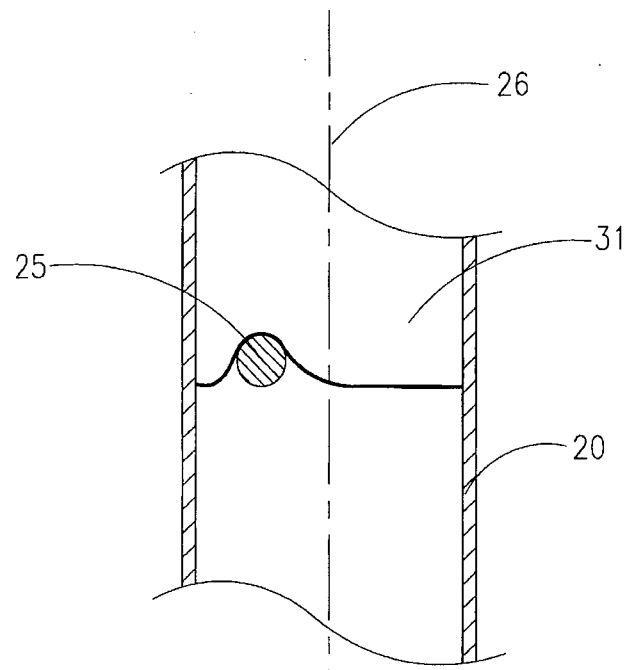
_Fig. 7a_

METHODS AND APPARATUS FOR USE IN ULTRASONIC RANGING

BACKGROUND OF THE INVENTION

1. Field of the Invention

This invention relates in general to systems and methods for determining fluid volume, detecting fluid leaks, and monitoring fluid inventory in one or more tanks by the use of ultrasonics, and more particularly, as these systems and methods are applied to underground storage tanks (UST).

2. Prior Art

The need to accurately measure the volume of a fluid in a vessel, such as an underground gasoline tank, has long been recognized. Perhaps the oldest, and, at least at one time, the most common way of determining the volume of fuel was to insert a gauge stick into the tank and read the height of the fluid from the line formed on the rod by the fuel's surface. However, this method only provides course estimates of the volume that are no longer acceptable in meeting today's environmental requirements.

In an effort to overcome the various shortcomings of the gauge stick, other devices and methods have been tried. One of these is the use of ultrasonic ranging systems. Examples of the earlier ultrasonic ranging systems can be found in U.S. Pat. Nos. 3,113,456; 3,184,969; and 3,394,589. In these systems the transducer was placed above the fuel surface and measurements were made from the top of the tank to the fuel surface. This measure was then subtracted from the known distance of the bottom of the tank to the top of tank to obtain the level of the fuel in the tank. From that calculation and the known geometry of the tank, the volume of fuel in the tank could be calculated. However, because of variance in the fuel surface level due to temperature fluctuations in the tank, variance of the speed of sound depending on the medium in which the sound waves were travelling, as well as, the accumulation of water in the bottom of the tank, these systems could not provide the accuracy now demanded.

In an attempt to overcome some of the difficulties of these earlier ultrasonic ranging systems, reference reflectors were added to provide data which could compensate for the environmental conditions within a fuel tank. In addition, the transducer began to be placed within the fuel rather than above the fuel in order to facilitate the determination of how much water had accumulated in the bottom of the tank. Examples of these systems can be found in U.S. Pat. Nos. 4,170,765; 4,210,969; 4,337,656; 4,470,299; and 4,578,997. Although these systems represented an improvement over the prior art systems of that time, the combination of tank geometry, variations in the speed of sound through the propagation medium, the electronic circuitry, and the probe design still limited the performance of such systems.

In 1988 the U.S. Environmental Protection Agency (EPA) finalized regulations for underground storage tanks (UST) containing petroleum or other hazardous substances. The regulations established the requirement that release detection procedures for USTs must be implemented. In response to these regulations six general categories of release detection methods have been developed: tightness or precision testing, tank gauging systems, inventory control methods, ground-water monitoring, vapor monitoring, and interstitial monitoring.

The last three categories are secondary methods; that is, the product release is detected via external sensors placed in the immediate area of the tanks and the piping system. This invention can work in conjunction with these secondary methods. On the other hand, the first three categories for leak detection are primary - methods; that is, these methods provide direct evidence of the loss of a product.

For inventory control purposes, these EPA regulations require that the system must make a gasoline level measurement and interval temperature measurements so as to compensate the inventory to a reference temperature (typically 68° F.). Correspondingly, the gasoline level and temperature must be measured to within 0.1" and 2.0° F., respectively. In addition, a system must be able to detect product losses as small as 0.1 gallons per hour. In a typical UST this last requirement means that the system must be able to detect differential changes in fuel level to within 0.0005 inches and differential changes in temperature within the UST to within 0.005° F.

These regulations impose extraordinary performance requirements on the accuracy, resolution and repeatability of the fuel level measurement. In order to obtain these performance requirements, more recent ultrasonic ranging systems have modified the reference reflectors and signal discrimination electronics in the systems in an effort to better discriminate between the primary echo signals and the secondary echo signals created within the systems, as well as to better detect the exact time in which a primary echo signal is received. Examples of these systems are seen in U.S. Pat. Nos. 4,748,846, 4,805,453 and 4,984,449.

However, even these most current prior art systems do not provide the performance nor the function capabilities necessary to determine the fuel volume in a tank, the leak rate from the tank, or maintain the inventory record for the tank being monitored as is required by the EPA. There still exists a need for an ultrasonic ranging system which can more accurately take into consideration the operating environment within a UST when making such measurements.

OBJECTS AND SUMMARY OF THE INVENTION

Therefore, one object of this invention is to provide an ultrasonic probe for use in an ultrasonic ranging system, as well as an ultrasonic ranging system and a method, which will accurately and repeatedly measure fluid level and then the fluid volume in a tank of known dimensions.

Another object of this invention is to provide an ultrasonic probe for use in an ultrasonic ranging system, as well as an ultrasonic ranging system, and a method which will accurately and repeatedly measure the fluid leakage rate from a tank of known dimensions.

Still another object of this invention is to provide an ultrasonic probe for use in an ultrasonic ranging system, as well as an ultrasonic ranging system, and a method which will accurately monitor the fluid flow.

Accordingly, an ultrasonic probe utilized in an ultrasonic ranging system for determining fluid volume and/or fluid leakage, as well as monitoring fluid inventory, in an underground storage tank is provided which is characterized by (i) having its calibration reflectors positioned whereby each of the secondary echo packets formed by the calibration reflectors of the ultrasonic probe becomes imbedded in the trailing edge of a primary echo packet of another calibration reflector or to cause its secondary echo packet to be detected by the transducer after the transducer has detected a primary echo packet associated with the fluid surface, (ii) each of the calibration reflectors being positioned perpendicular to and offset from the longitudinal axis of the probe body, (iii) an ultrasonic sound wave dampening member fixedly positioned in the probe body between the transducer assembly and the tank bottom, the wave dampening member having a surface facing toward the transducer assembly wherein the surface is configured to dampen sound waves striking the surface before the sound waves are reflected from the surface, or (iv) the transducer assembly comprising a transducer body in which is housed a piezoelectric crystal oriented perpendicular to the longitudinal axis of the probe body, wherein the transducer body is structured to dampen selected ultrasonic sound waves which emanate from the crystal.

Also provided are an ultrasonic ranging system for use in measuring fluid level and leak detection in an underground storage tank cavity of known dimensions having an ultrasonic probe as described above, a transducer assembly positioned between the tank cavity bottom and the probe calibration reflectors for transmitting a packet of ultrasonic sound waves within the ultrasonic probe and detecting primary and secondary echo packets reflected from each calibration reflector and from the fluid surfaces, which is characterized by inclusion of electronic components which (i) permit transmitting the electrical signal from the transducer directly to a DAC prior to further processing or analysis, (ii) permit transmitting the electrical signal from the transducer directly to a FWR/LPF prior to further processing or analysis, (iii) permit transmitting the electrical signal from the transducer directly to a ADC prior to further processing or analysis, (iv) permit a synchronizer to simultaneously transmit a firing signal to a pulser and a start signal to a timer when the synchronizer detects the rising edge of a clock cycle, (v) permit a micro-controller to read a timer stopped when a threshold detector has detected a rectified, filtered signal greater than a pre-determined threshold voltage, (vi) permit a micro-controller to read a timer stopped when a zero-crossing detector has been enabled and has detected the first zero-crossing signal after being signaled by a threshold detector that it detected an electrical signal greater than a set threshold voltage, (vii) permit an inverter to receive and invert the electrical signals originating from the transducer prior to their transmission to a threshold detector and/or a zero-crossing detector, or (viii) permit combinations of the above signal processing and analysis.

Also disclosed is a method for determining the volume of a fluid from a tank cavity of known dimensions utilizing an ultrasonic ranging system such as described above, characterized by the inclusion of the steps of: (i) synchronizing the firing signal and/or start signal from a synchronizer to a pulser and/or timer, respectively, with the rising edge of a clock cycle, (ii) amplitude adjusting by a DAC/amplifier the electrical signals from the transducer, (iii) rectifying and filtering by a FWR/LPF the primary echo packets associated with the fluid surfaces, the tank bottom, and the calibration reflectors to form primary echo envelopes, (iv) digitizing by a ADC the primary echo packets or primary echo envelopes associated with the fluid surfaces, the tank bottom and the calibration reflectors prior to their scanning by a microcomputer to detect the leading edge of each primary echo packet, or (v) (1) storing in the memory of a micro-controller preliminary TOF of the leading edge of each primary echo envelope associated with the fluid surfaces, the tank bottom, and the submerged calibration reflectors determined from scanning a low gain amplitude adjusted, rectified, filtered, digitized electrical signal and a high gain amplitude adjusted, rectified, filtered, digitized electrical signal, (2) enabling a threshold detector to scan for an electrical signal from a low gain amplitude adjusted, rectified, filtered electrical signal for the purpose of detecting a voltage signal greater than a pre-determined threshold voltage, (3) enabling a threshold detector to scan the electrical signal from a high gain amplitude adjusted, rectified, filtered electrical signal for the purpose of detecting voltage signals greater than another pre-determined threshold voltage, (4) stopping a timer each time that the threshold detector detects a searched for electrical signal, (5) reading the time of each stop of the timer by the microprocessor, and (6) calculating from the read times and the known geometry of the tank cavity the fluid volume in the tank cavity.

Further disclosed is a method for determining the fluid leakage from a tank cavity of known dimensions utilizing an ultrasonic ranging system such as described above, characterized by the inclusion of the steps of utilizing the preliminary TOF obtained in the fluid volume measurements described above to set the periods of enablement of a threshold detector and a zero-crossing detector to scan the electrical signals originating from the transducer to detect the first electrical signals after enablement greater than a pre-determined threshold voltage and to detect the first zero-crossing after the detection of the first electrical signals greater than the threshold voltage.

BRIEF DESCRIPTION OF THE DRAWINGS

The specification and the accompanying drawings show and describe a preferred embodiment of this invention, but it is to be understood that this embodiment is not intended to be exhaustive nor limiting of the invention, but on the contrary is given for the purpose of illustration in order that others skilled in the art may fully understand the invention and the principles thereof and the manner of applying it in practical use so that they may modify and adapt it in various forms, each as may be best suited to the conditions of a particular use.

FIG. 5 is an exploded view of a preferred embodiment of the transducer assembly having a back-ranging trap.

FIGS. 7 and 7a are comparative cross-sectional views of a portion of the ultrasonic probe of the prior art compared to this invention illustrating the meniscus effect on the fluid surface as its level crosses a calibration reflector.

PREFERRED EMBODIMENTS OF THE INVENTION

Without limiting the scope of the invention, the preferred embodiments of the ultrasonic probe and the ultrasonic precision testing system, as well as the method of using the probe and system, are described in conjunction with measuring fluid levels and leakage rates in underground gasoline tanks of a typical retail gasoline station.

Figure 1:
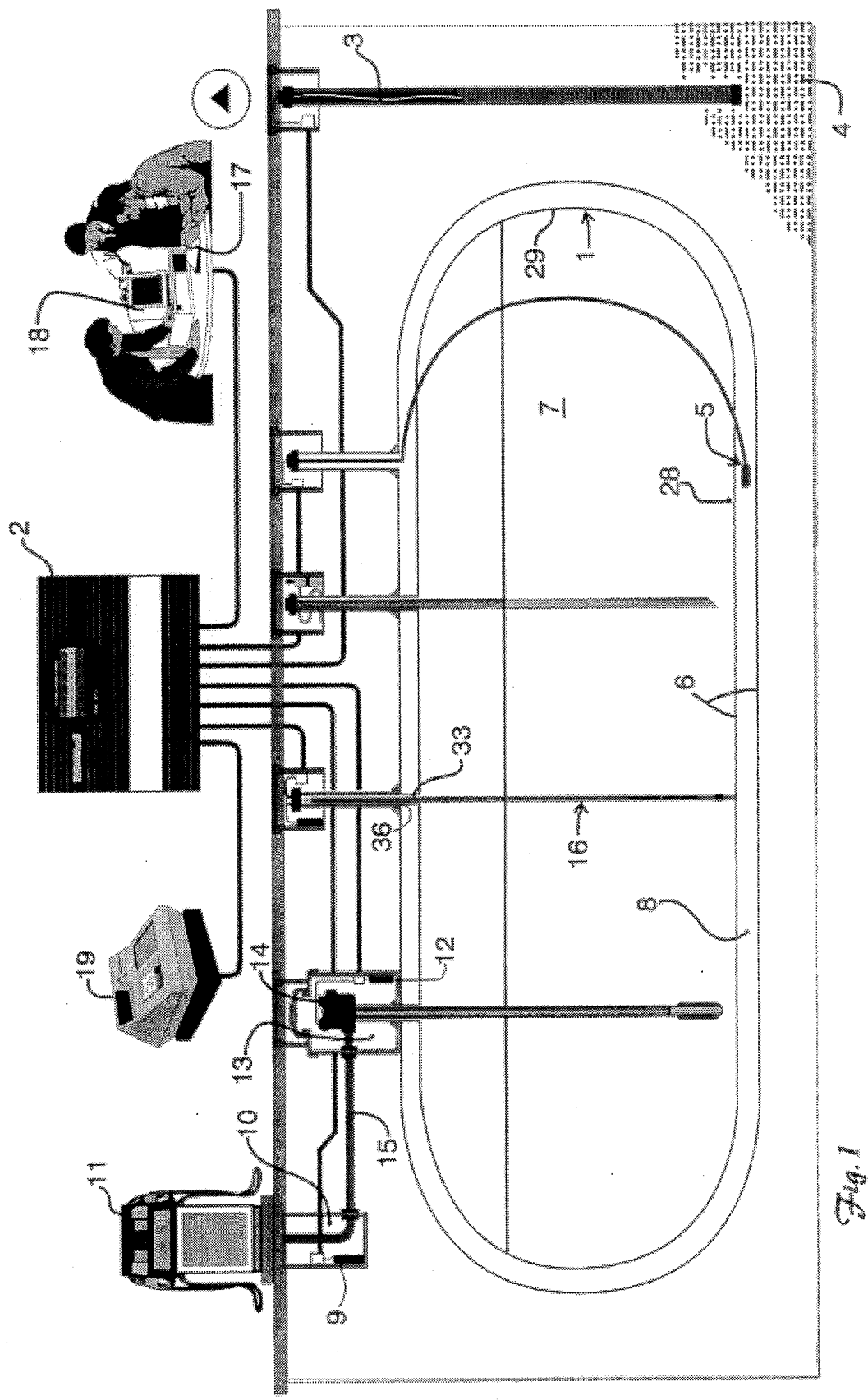
FIG. 1 is a pictorial representation of a system of this invention as applied to an underground gasoline tank.

Referring to FIG. 1, a pictorial schematic diagram of a typical double wall underground gasoline tank 1 of known dimensions is illustrated having various fluid level and leak detection monitoring devices electronically interfaced to a microprocessor forming part of a site operating controller 2. More particularly, the area around tank 1 is provided with monitor well sensors 3 which are used to detect the presence of gasoline in the tank bed 4. In addition, interstitial sensors 5 are placed between the double walls 6 of tank 1 to detect the presence of water which has leaked from tank bed 4 into inner wall cavity 8, or gasoline which has leaked from the primary tank cavity 7 into the inner wall cavity 8. It is also preferred that dispenser sump sensors 9 are positioned in the sump 10 beneath the gasoline dispensers 11 to detect the presence of water or gasoline which has leaked into sump 10. Likewise pump sump sensors 12 are positioned in sumps 13 in which submersible pumps 14 are positioned. Pump sump sensors 12 are used to detect the presence of water or gasoline which may have leaked into sump 13. In addition it is preferable that pressure sensors be installed in the line 15 that convey the gasoline from primary tank cavity 7 to gasoline dispensers 11 to monitor the pressure in these lines for the purpose of line leak detection. Finally, there is an ultrasonic probe 16 which is used to measure the gasoline and/or water level in primary tank cavity 7, as well as to determine the gasoline leakage from primary tank cavity 7.

The various sensors and ultrasonic probe 16 are electronically interfaced with site operating controller 2. Keyboard 17 and CRT monitor 18 are operatively connected to site operating controller 2 to permit the display of data obtained from the various sensors and ultrasonic probe 16. Additional information relating to inventory control and sales can also be automatically monitored by a point-of-sale register 19 electronically interfaced with site operating controller 2.

The Ultrasonic Probe

Turning to FIGS. 2–6 a preferred embodiment of ultrasonic probe 16 is shown. Probe 16 comprises an elongated, hollow probe body 20 having a top end 21 to which a bushing assembly 22 for holding probe body 20 in a vertical position within primary tank cavity 7 is attached, and having a bottom end 23 to which a transducer assembly 24 is attached. Additionally, probe 16 comprises a series of calibration reflectors 25 which extend in a plane that is perpendicular to the longitudinal axis 26 of probe body 20, and which are positioned in the plane so as to be offset from longitudinal axis 26.

In a preferred embodiment shown in FIG. 7, the calibration reflectors 25 are vertically separated to produce primary echo packets of reflected ultrasonic sound waves having approximately equal peak strength when detected by transducer assembly 24. It is more preferred that the peak strength of the primary echo packet from the gasoline surface be at least three, and more preferably five, times greater than the peak strength of the primary echo packets from the calibration reflectors 25.

The primary echo packets strike transducer assembly 24 and are reflected back to calibration reflectors 25 which in turn are reflected back toward transducer assembly 24 as secondary echo packets. It is still more preferred that calibration reflectors 25 be positioned so that the detection of secondary echo packets resulting from activation of transducer assembly 24 be slightly delayed with respect to the detection of a primary echo packet from a different calibration reflector so as to embed the secondary echo packets in the trailing edge of a primary echo packet.

Still further, it is preferred that all calibration reflectors 25 be offset from longitudinal axis 26 so as to minimize the fluid level signal loss associated with the surface distortion cause by the effect of the meniscus as illustrated in FIG. 7.

The exact position of calibration reflectors 25 to achieve these effects will vary depending on the diameter of probe body 20, the size and shape of the calibration reflectors 25, the frequencies of the sound waves, and the fluid contained in the tank cavity 8.

Figure 8:
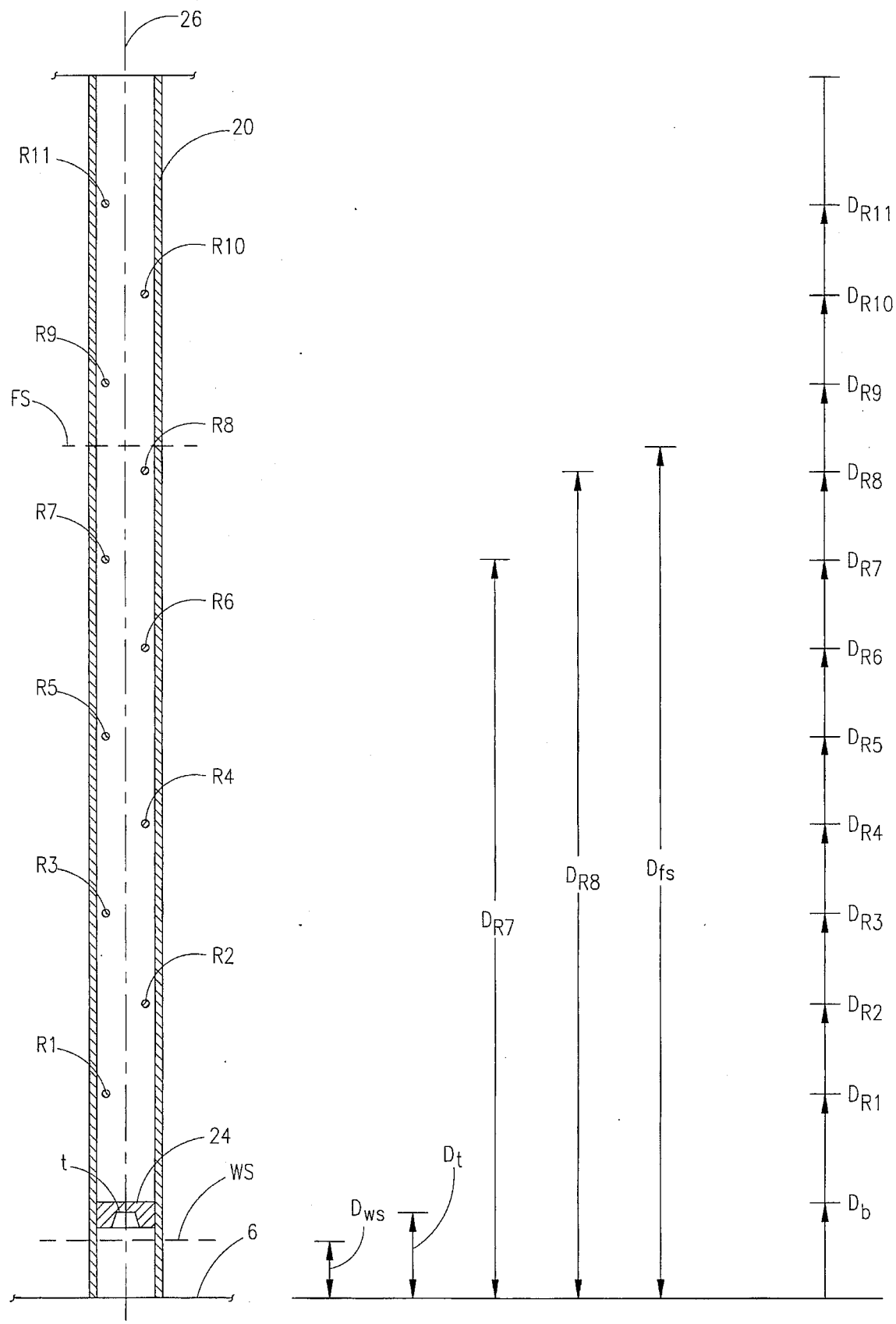
FIG. 8 is a representative cross-sectional view of a preferred embodiment of the ultrasonic probe illustrating the positioning of the calibration reflectors within the ultrasonic probe and tank cavity wherein the fluid level is between calibration reflectors $R_8$ and $R_9$.

It is preferred for cylindrical probe body 20 to have an inside diameter of approximately two inches, that calibration reflectors which are constructed from metal rods should be spaced apart approximately seven and quarter inches and offset from longitudinal axis 26 approximately ½ inch. It is more preferred that at least those calibration reflectors positioned in the lower half of tank cavity 8 be separated from adjacent calibration reflectors by progressively smaller distances, as well as alternately offset on opposite sides of the longitudinal axis 26. For example, as shown in FIG. 8, the distance between calibration reflectors $R_1$ and $R_2$ will be different from distance between calibration reflectors $R_2$ and $R_3$.

Figure 2:
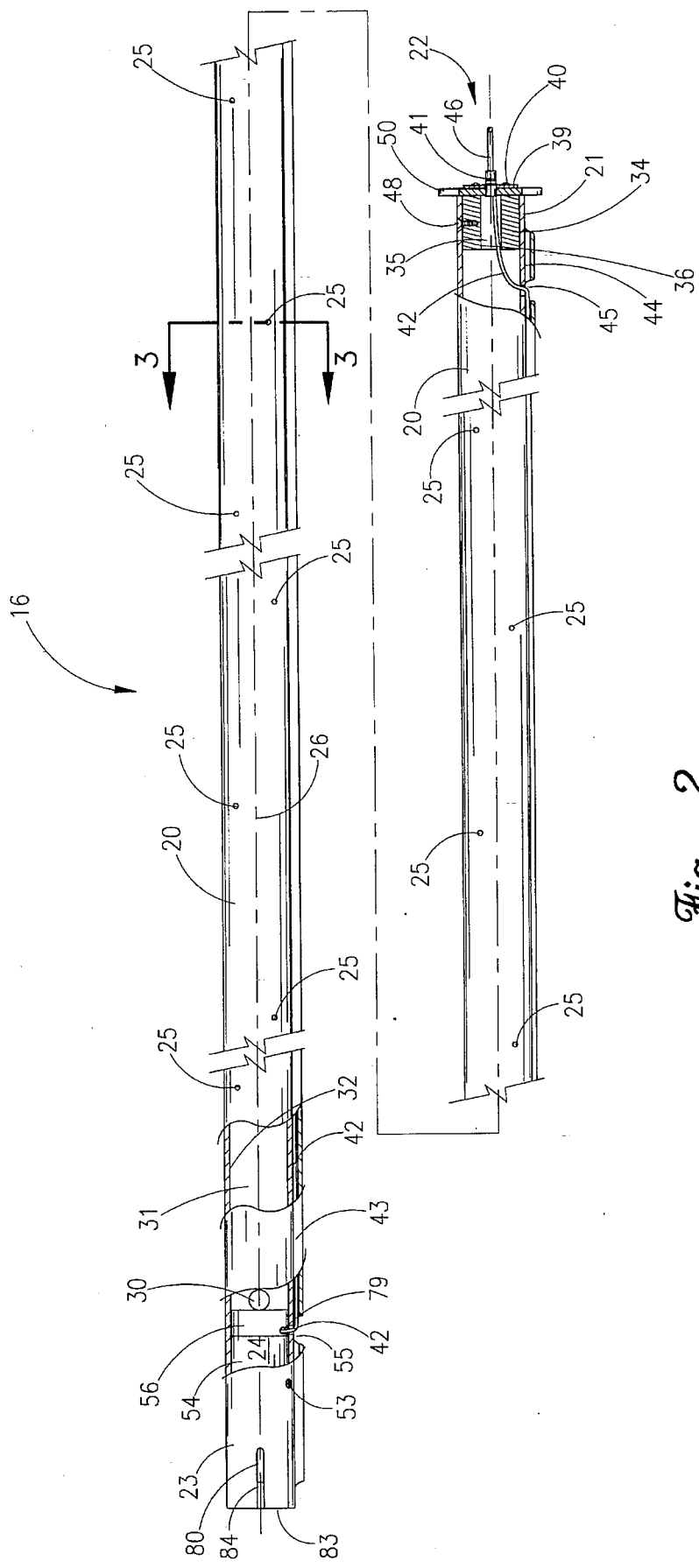
FIG. 2 is a three-dimensional partially cutaway side view of the probe assembly.
Figure 3:
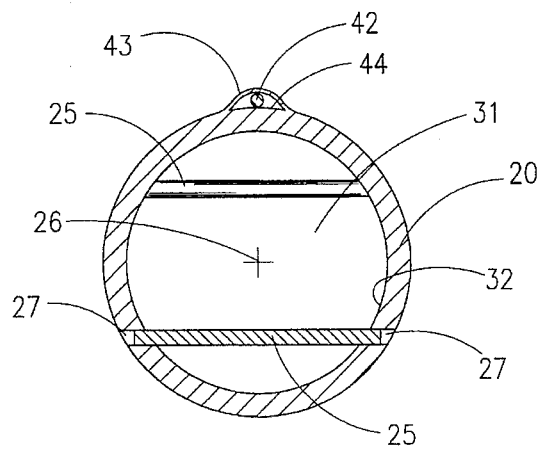
FIG. 3 is a cross-sectional view of the probe body illustrating the position of a calibration rod relative to the longitudinal axis of the probe body.

For a typical underground gasoline storage tank having a diameter of 96 inches, it is preferred that there be eleven calibration reflectors. In a more preferred embodiment as seen in FIGS. 2 and 3, probe body 20 will be constructed with pairs of aligned openings 27 through which the opposite ends of calibration reflectors 25 can extend and be fixed in pre-determined positions such as by gluing or other conventional securing methods. In this configuration, transducer assembly 24 is positioned so that its piezoelectric crystal will be approximately 8 inches from the bottom of the tank cavity. Then the calibrations reflectors, $R_1$ through $R_{11}$, will be positioned in increasing distances from the piezoelectric crystal. In a particularly preferred embodiment, the distance between the piezoelectric crystal and $R_1$ is 8.0", and the distance between successive calibration reflectors, starting with the distance between $R_1$ and $R_2$, is set to be 7.8", 7.6", 7.4", 7.2", 7.0", 8.0", 7.8", 7.6", 7.4", and 7.2", respectively Probe body 20 will preferably be constructed from a material having poor thermal conductivity and which is rigid enough to maintain the position of the transducer assembly 24 relative to the calibration reflectors 25. A preferred material is fiberglass. Probe body 20 will be of sufficient length to permit top end 21 to extend above the surface of the gasoline in primary tank cavity 7 while allowing bottom end 23 to extend to the floor 28 which along with inner side walls 29 form primary tank cavity 7.

Probe body 20 will also be provided with at least one opening 30 positioned above transducer assembly 24 to permit the fluids in primary tank cavity 7 to flow into passageway 31 of probe body 20 at a position above transducer assembly 24. A second opening 32 is located below bushing assembly 22 to permit the pressure inside passageway 31 to equalize with the pressure inside primary tank cavity 7. This will result in the gasoline level in passageway 31 being the same as in cavity 7. It is also preferred that passageway 31 be of relatively uniform cross-section and that its cross-section be sized to permit the fluid inside passageway 31 to form a substantially flat surface to avoid any significant effect from the meniscus formed by the gasoline on the probe's interior walls at the gasoline surface level. When the fluid is gasoline, the preferred cross-section configurational is a circular cross-section no greater than 2 inches in diameter. The actual configuration would depend on the viscosity of the fluid and the material from which the inner walls 32 forming passageway 31 are constructed, as well as other known factors.

Bushing assembly 22 should be designed to vertically align and hold probe body 20 whereby its longitudinal axis 26 is substantially perpendicular to the fluid surface. The actual design will be dependent upon the construction of tank 1 and the access opening 33 provided for probe body 20 to extend down into cavity 7. The design will also be dependent upon whether the probe body 20 will be part of a permanent construction that would be more typical of a leak detection or inventory monitoring system, or part of a portable leak detection measurement system.

Figure 4:
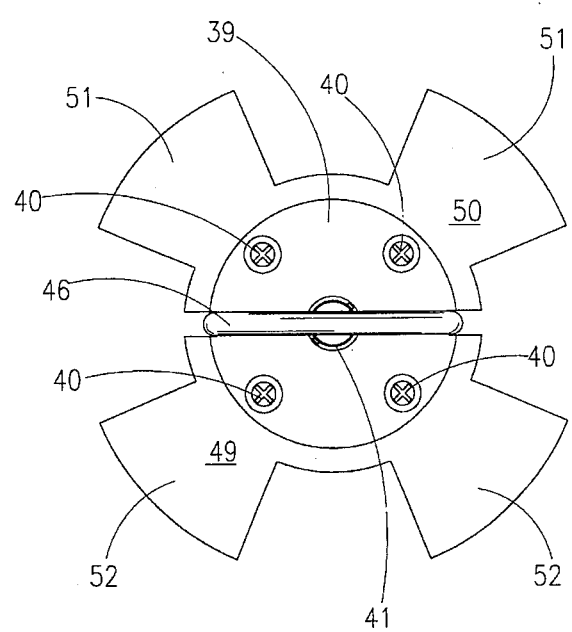
FIG. 4 is a top view of a preferred embodiment of the bushing assembly used to vertically position the probe body.
Figure 4A:
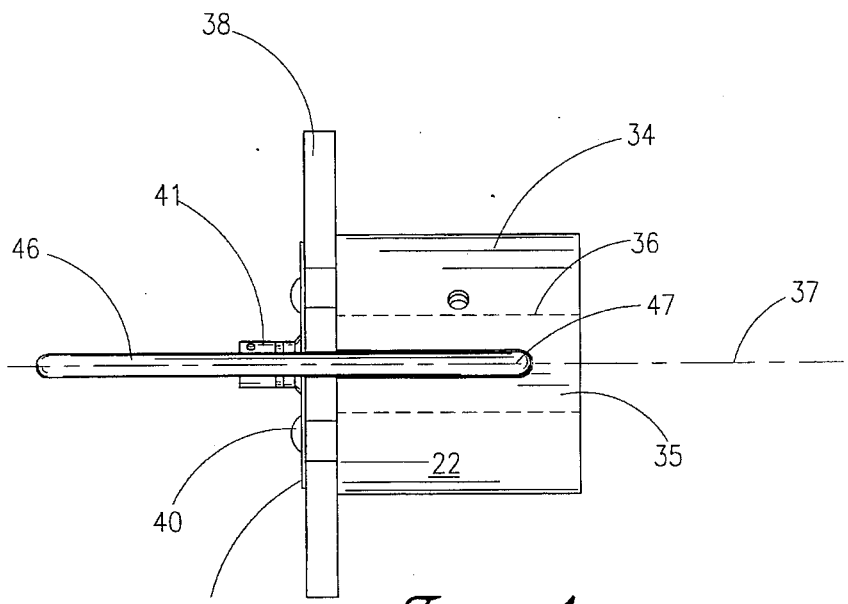
FIG. 4a is a side view of the preferred embodiment of the bushing assembly shown in FIG. 4

Bushing assembly 22 illustrated in FIGS. 2 and 4 is a preferred embodiment for use in a permanent leak detection or inventory monitoring system. In this embodiment, bushing assembly 22 comprises bushing 34 sized and shaped to fit through the top end 21 of probe body 20 and into passageway 31. Bushing 34 is preferably provided with its own passageway 35 formed by wall surfaces 36 extending concentric to the longitudinal axis 37 of bushing 34. In a more preferred embodiment axis 37 and axis 26 are aligned with one another. Positioned on top of bushing 34 is a flexible member 38 that extends perpendicular from bushing 34 and is sized to contact the side walls 36 forming tank opening 33. Member 38 is held in position by rigid plate 39 and screws 40 as shown in FIGS. 2 and 4.

Bushing assembly 22 also comprises a BNC connector 41 which extends perpendicularly from plate 39. Operatively connected to BNC connector 41 is electrical cable 42 extending downward through member 38 and into passageway 35. In a more preferred embodiment, a cable guideway 43 formed by wall 44 extends parallel to axis 26 along the exterior of probe body 20. In an alternate embodiment cable guideway 43 could be formed along the interior of probe body 20. An opening 45 is provided in probe body 20 which connects passageway 31 to cable guideway 43 to permit cable 42 to extend into guideway 43. Cable guideway 43 preferably extends along the exterior of probe body 20 at least to a position adjacent transducer assembly 24.

Bushing assembly 22 may also comprise bail 46 which is attached at its lower ends 47 to bushing 34 and extends through member 38 and plate 39 to form a loop above plate 39 that can be used to lower probe body 20 into cavity 7. Bushing 34 is fixed to probe body 20 preferably by screws 48 or other known means to allow the bushing assembly 22 to be removed for repair.

In another preferred embodiment, member 38 is constructed of two rubber pieces 49 and 50, each piece having a pair of protruding ears 51 and 52, respectively. Ears 51 and 52 extend outward to contact and apply sufficient pressure against wall surface 100 to hold probe body 20 in a vertical position in cavity 7. Ears 51 and 52 are preferably constructed from material of sufficient flexibility to allow them to bend as they press against wall surface 36 while probe body 20 is being lowered into cavity 7.

Figure 6:
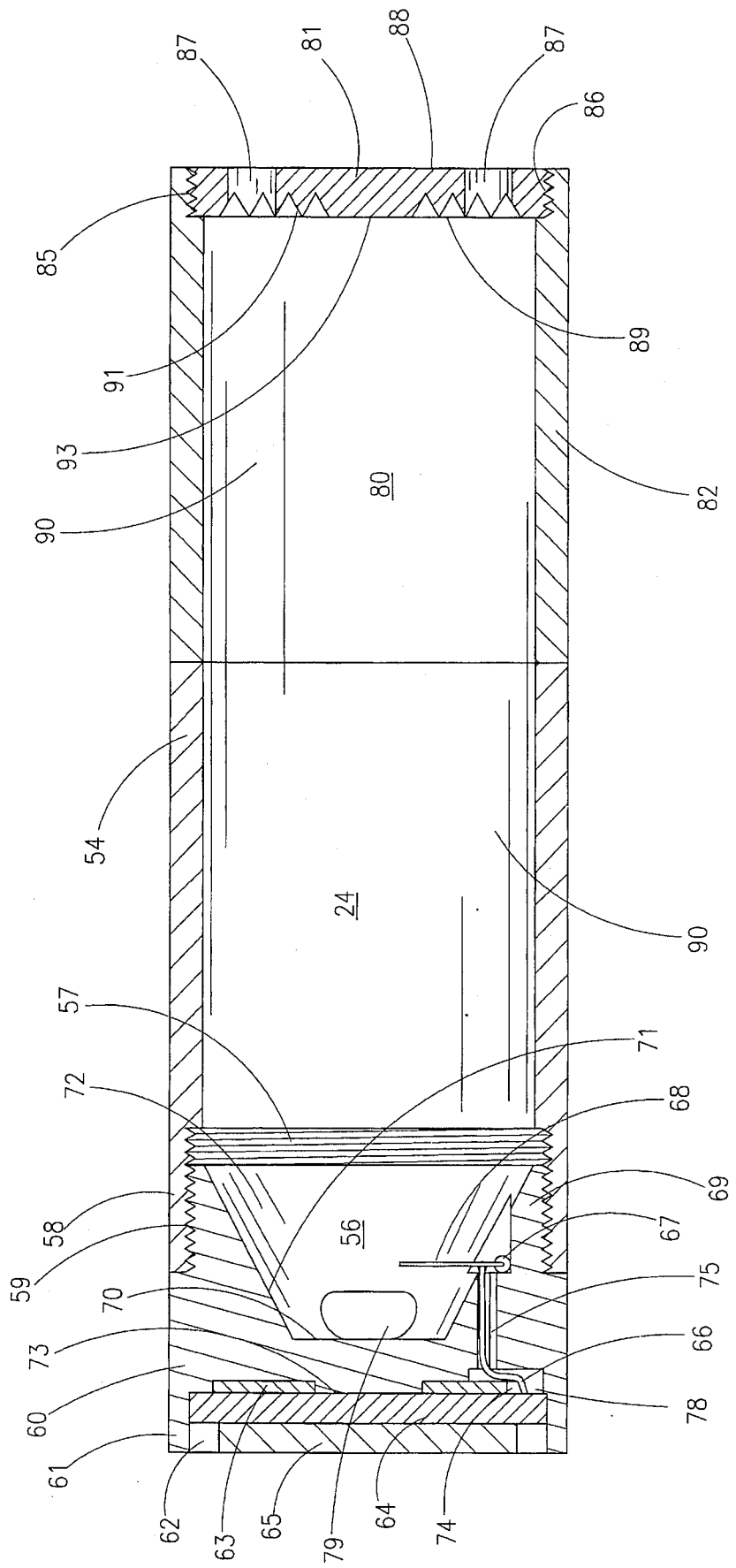
FIG. 6 is a cross-sectional view of the preferred embodiment of the transducer assembly shown in FIG. 5.

Referring to FIGS. 1, 5 and 6, transducer assembly 24 is attached at the bottom end 23 of ultrasonic probe 16. This attachment can be by any conventional means such as screws 53 which extend through probe body 20 and transducer tubing member 54 forming part of transducer assembly 24. Probe body 20 is also provided with an opening 55 through its exterior wall positioned above transducer assembly 24 to permit cable 42 to extend from cable guideway 43 back into passageway 31 via opening 79 in transducer body 60 where it can then be operatively connected to transducer assembly 24 as described below.

Attached to transducer tubing member 54 is a transducer 56 which serves as both an ultrasonic pulse transmitter and an ultrasonic pulse receiver. A preferred means of attaching transducer 56 to tubing member 54 is to construct tubing member 54 with an interior threaded wall 57 at one end 58 to matingly receive the exterior threaded end 59 of transducer body 60. The opposite end 61 of transducer body 60 is provided with a cavity 62 into which are fixedly fitted a damper ring 63, a piezoelectric crystal 64, and a cover 65

Electrical wires 66 are fixed to crystal 64 and extend through a notch 74 cut in damper ring 63 and further extend through wire passageways 75 and 76 in transducer body 60 to operably connect to resistor 67. After these connections are made it is preferred that any cavity be filled with a potting compound to provide for a smooth surface and to isolate the leads from the fluid. It is also preferable that a wall surface 77 which is indented from wall surface 73 be provided for damper ring 63 to be fixedly positioned. Wall surface 77 can also be provided for a second indentation cavity 78 to permit electrical wires 66 to be bent and extend into wire passageways 75 and 76. Coaxial cable 42 which passes through one of the oppositely positioned openings 79 is operatively connected to resistor 67 via one of its leads 68.

It is also preferred that transducer 56 be constructed to provide maximum energy transfer to the gasoline in the upward direction of travel while providing the means to control the strength of the back ranging signal. In a preferred embodiment the desired energy transfer can be achieved if transducer body 60 is shaped so that its lower end 69 facing tank cavity floor 28 has a flat top wall surface 70 which with outwardly tapering side wall surfaces 71 form a partial cone-shaped interior cavity 72. The strength of the backgoing ultrasonic pulses can be controlled by the shape of cavity 72, the shape of transducer body 60, and the amount of contact area between crystal 64 and transducer body 60; i.e., the size of wall surface 73.

The slope of side wall surfaces 71 is selected to trap and internally dissipate any sound waves emanating from crystal 64 and not impinging flat surface 70.

The cross-sectional area of the flat top wall surface 70 and contact surface between crystal 64 and wall surface 73 can be varied to optimize the strength of the ultrasonic pulse reflection from the gasoline/water interface located below transducer body 60.

A preferred sound wave dampening means is back-ranging trap assembly 80 which comprises back-ranging trap 81 fixed to one end of tubing 82. Tubing 82 is fixed connected to tube 54 in passageway 31 by screws, glue, or any other common attaching means. Tubing 82 is preferably of the same diameter as transducer tubing member 54 to permit the two to abut one another when positioned in probe body 20. Tubing 82 has a length which preferably extends a fixed distance from bottom edge 83 of probe body bottom end 23 when it is inserted into passageway 31 and abuts against transducer tubing member 54. Alternately, tubing 82 and tubing member 54 may be one piece.

Probe body 20 will be provided with slots 84 extending from bottom edge 83 a sufficient distance to allow the fluid in tank cavity 7 to enter probe body 20 at a position above back-ranging trap 81.

In a preferred embodiment tubing 82 is provided with an interior threaded end 85 to permit exterior threaded end 86 of back-ranging trap 81 to be fixed into position within tubing 82.

Back-ranging trap 81 is provided with one or more passageways 87 extending through opposite sides 88 and 89 of back-ranging trap 81 to permit installation and removal of trap 81. Aligned openings 92 are provided in tubing 82 which align with slots 84 at a position between cavity 72 and back-ranging trap 81 to permit fluid to flow into chamber 90. Side 89 is constructed whereby its surface is formed by a series of concentric ridges 91 and a flat back ranging target 93. This construction provides for further means to control the strength of the bottom reflection of ultrasonic waves reflected back to transducer 56. The difference in area of the water/gasoline interface and the back ranging target 93 on the trap 81 provides the means to discriminate between the tank bottom and water/gasoline interface.

It is also preferred that back-ranging trap 81 be constructed from material that is stable in gasoline and water, yet possesses sound dampening characteristics. Suitable material would include various known rubber compounds, as well as other metal or non-metal materials having similar sound dampening characteristics. The shape of side 89 could also be varied to form other configurations which are known to trap sound waves.

The Ultrasonic Ranging System

FIGS. 9a–9d are block diagrams of the electronic circuitry used with the ultrasonic probe 16 to form ultrasonic ranging systems that can be used to determine fluid volume in tank 1, to determine the leakage rate from tank 1, and/or to monitor the inventory of fluid flowing into and out of tank 1. This information is provided via measurements of the time of flight (TOF) of the leading edge of the echo packets or echo envelopes associated with the fluid surface and/or certain specified calibration reflectors 25.

Depending on the resolution desired, the type of measurement being made, the sensitivity of the circuitry employed, and/or the fluids contained in tank cavity 8, only certain portions of the electronic circuitry may need to be utilized. It has been discovered that the precision of the TOF measurements can be improved over the prior art systems by employing one or more of the following features in the particular ultrasonic ranging system being utilized: (1) operatively connecting synchronizer 101 and clock 102, to activate pulser 103 and to start timer 109 in synchronization with the rising edge of a clock cycle after synchronizer 101 has received a command signal from micro-controller 100 to activate pulser 103, (2) operatively connecting in the low resolution measurements ADC 112 to transducer 104 to directly receive and digitize the electrical signals generated by transducer 104, (3) operatively connecting DAC 105 to directly receive the electrical signals generated by transducer 104, and if in a low resolution measurement, prior to their digitization by ADC 112, and (4) operatively connecting FWR/LPF 107 to directly receive the electrical signals generated by transducer 104, and if in a low resolution measurement, prior to their digitization by ADC 112.

It has been further discovered as discussed below that consistent, accurate TOF measurements for fluid volume determinations can be made if transducer 104, attentuator 105, amplifier 106, FWR/LPF 107, and ADC 112 are operatively connected to permit the electrical signals generated by transducer 104 to be amplitude adjusted by attentuator 105 and amplifier 106, before rectification and filtering by FWR/LPF 107 to form the primary echo envelope signals which are then digitized by ADC 112 prior to storage and/or analysis of the digitized signals by micro-controller 100. It is preferred that the TOF measurements for fluid volume determinations be made utilizing threshold detector 108 to scan the electrical signals from FWR/LPF 107 upon receipt of a scanning signal from micro-controller 100 to detect an electrical signal greater than a selected threshold voltage signal, and to signal timer 109 to stop upon detection of the electrical signal.

It has been further discovered that precision measurements of possible leak detection in a UST can be made, if attentuator 105/amplifier 106, threshold detector 110, zero crossing detector 111, timer 109, and micro-controller 100 are operatively connected to permit the amplitude adjusted electrical signals from attenuator 105/amplifier 106 to be scanned by threshold detector 110 for the first zero-crossing signal after gating the zero-crossing detector 111 on and receiving an enabling signal from threshold detector 110 when it detects the first signal greater than the pre-determined value, so as to permit zero-crossing detector 111 to stop timer 109 once it has detected the first zero-crossing signal. In a preferred embodiment, the amplitude adjusted signal from attentuator 105/amplifier 106 may be inverted by inverter 113 when $V_3$ has been set at a level greater than or approximately equal to the maximum peak of the first half cycle of the primary echo packet being examined.

In each of these alternate ultrasonic ranging systems, micro-controller 100 provides through its software the means to configure the electronics to obtain the desired measurements. Further, micro-controller 100 is used to send control signals to various electronic parts in the circuit and to receive and process the time and signal strength data generated by various parts of the electronic circuitry to obtain the TOF measurements and calculate the fluid volume or the fluid leakage from tank cavity 8.

In each of the measurement resolution levels, micro-controller 100 configures the ultrasonic ranging system as per the resolution measurement to be made. It then transmits a start signal to synchronizer 101 which is electronically connected to clock 102 in a manner to cause synchronizer 101 to send a firing signal to pulser 103 when synchronizer 101 detects a rising edge of a cycle from the signals transmitted by clock 102 which is also being transmitted to pulser 103. Upon detection of the rising edge, synchronizer 101 also simultaneously transmits a start signal to timer 109, as well as transmits a start signal to micro-controller to signal ADC 112 to begin digitizing any electrical signals which it may receive. Specific electronic circuitry which can perform this function is well known in the art.

Upon receipt of the firing signal from synchronizer pulser 103 transmits an electronic signal to transducer 104, which cause the crystal in transducer 104 to oscillate. This oscillation produces a packet of sinusoidal ultrasonic sound waves which are radiated from both sides of the transducer crystal. This packet of ultrasonic sound waves travel up probe body passageway 31 striking each of the calibration reflectors 25 and the fluid surface, and downward in chamber 90 striking the water surface and back-ranging trap 81 (or tank bottom when no back-ranging trap is used). As the transmitted wave encounters calibration reflectors 25 and/or the fluid surfaces some portion of the ultrasonic wave is reflected, and the corresponding echo packet is reflected back toward transducer 104. These echo packets are referred to as the primary echo packets.

The primary echo packets from each of these surfaces will strike transducer 104 and again reflected back through passageway 31 or chamber 90. These packets will strike the same surfaces and will be reflected back to the transducer 104 a second time. These reflected primary echo packets are referred to as secondary echo packets. A second type of secondary echo packet is created when the original echo packet from the transducer 104 first strikes the fluid surface and is then reflected from a calibration reflector back to the fluid surface and finally back to transducer 104. Because only a portion of the primary echo packet is reflected back a second time, the amplitude or strength of the sound waves in these secondary echo packets is diminished, but still detectable by transducer 104. The sound wave form of a typical echo packet is converted by the transducer 104 into a corresponding series of electrical signals (See top half of FIG. 12). The specific electronic circuitry which will cause the transducer crystal to oscillate at the desired ultrasonic frequency to produce ultrasonic waves, and to convert the reflected sound waves to corresponding electrical signals is well known in the art.

1. Low Resolution Measurement of Fluid Volume. Low resolution measurements are made to identify the echo packets associated with the fluid surface, the water surface, the tank bottom, and the calibration reflectors so as to be able to set the enabling and disabling timing gates on the threshold detectors 108 or 110 which is necessary in the medium and high resolution measurements. In addition there can exist tank volume measurements that do not need the high degree of accuracy obtained by the medium and high resolution measurement methods. For these situations the low resolution measurements can be used without further processing.

Figure 9A:
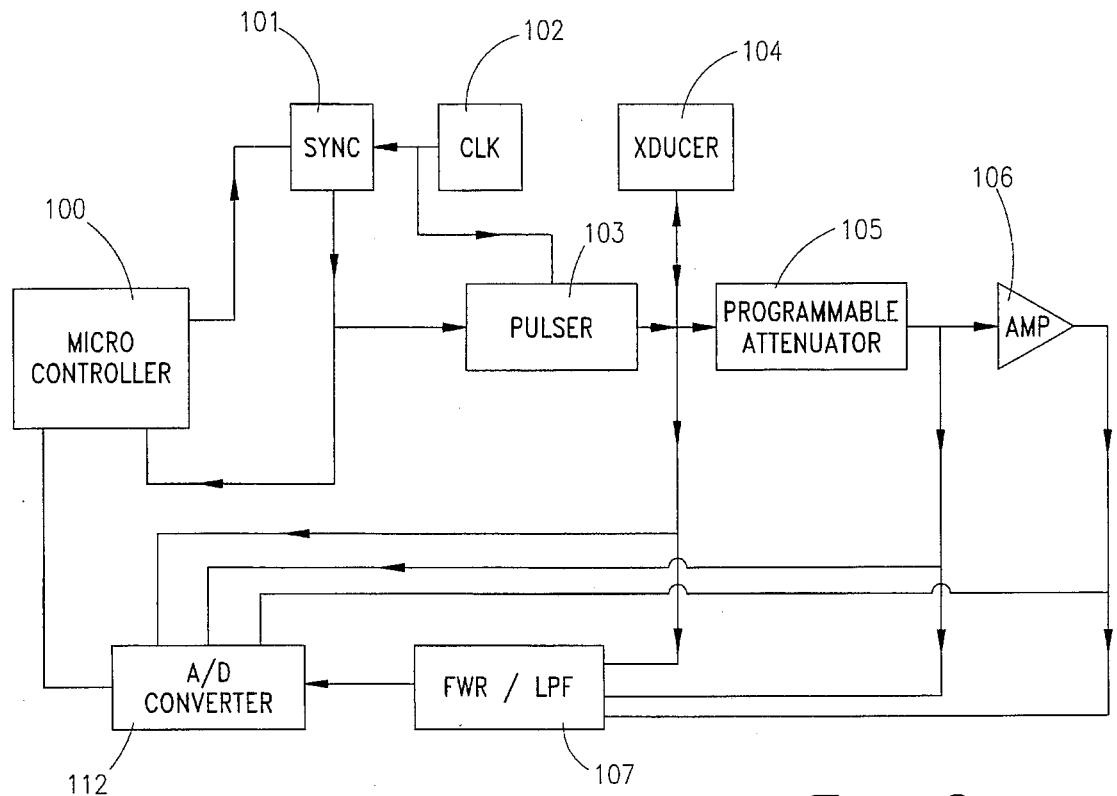
FIG. 9a is a block diagram illustrating the various operative relationships between the micro-controller, the synchronizer, clock, pulser, transducer, DAC, amplifier, FWR/LPF, and ADC used in making the various possible low resolution fluid volume measurements and determination of the leading edge of the primary echo packet or envelope associated with the fluid surface.
Figure 9B:
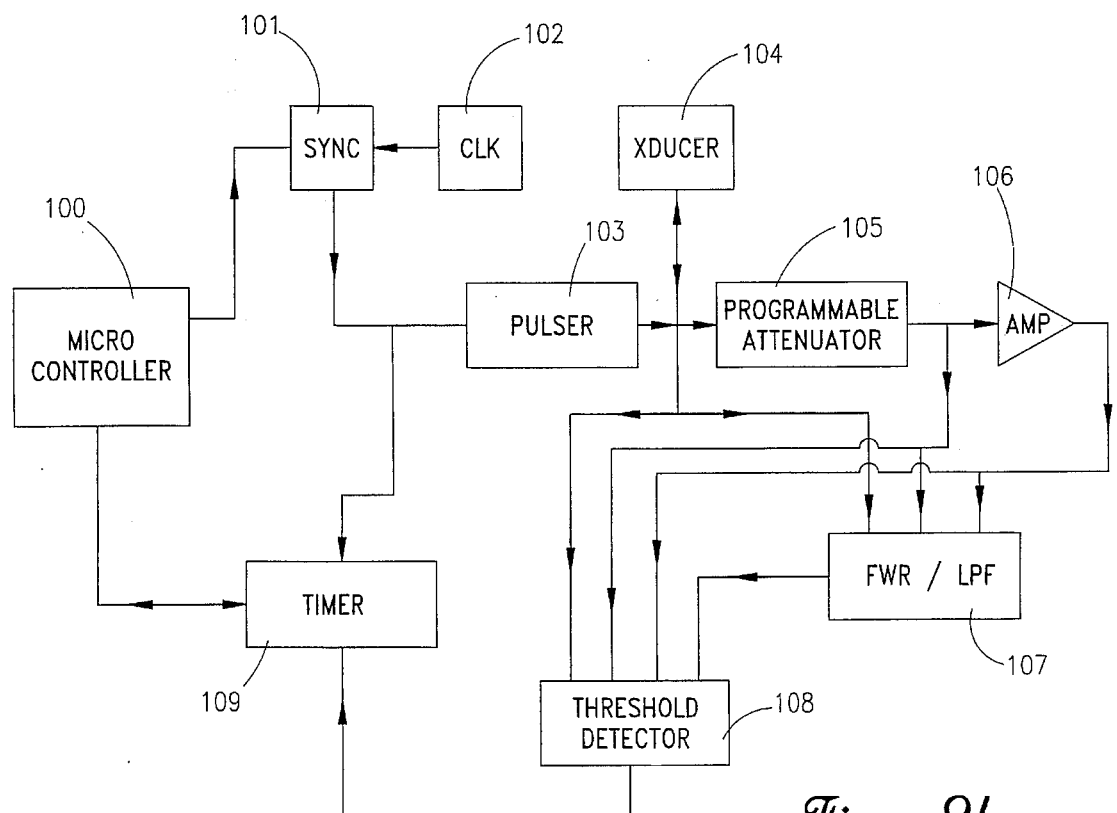
FIG. 9b is a block diagram illustrating the various preferred operative relationships between the micro-controller, the synchronizer, clock, pulser, transducer, DAC, amplifier, FWR/LPF, timer, and threshold detector used in making the various possible fluid volume measurements.
Figure 9C:
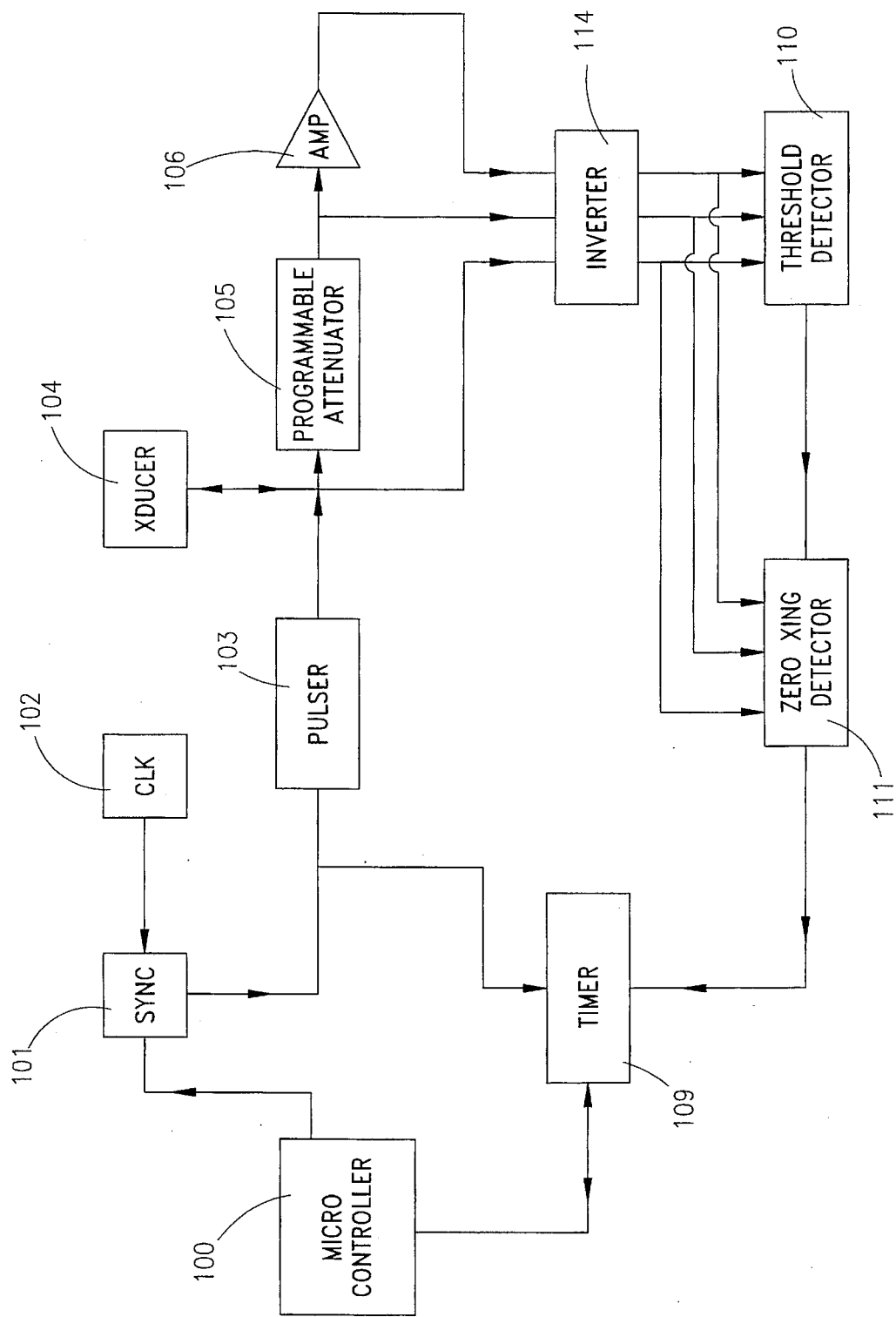
FIG. 9c is a block diagram illustrating the various preferred operative relationships between the micro-controller, the synchronizer, clock, pulser, transducer, DAC, amplifier, timer, inverter threshold detector and zero-crossing detector used in making the fluid leak detection measurements.
Figure 9D:
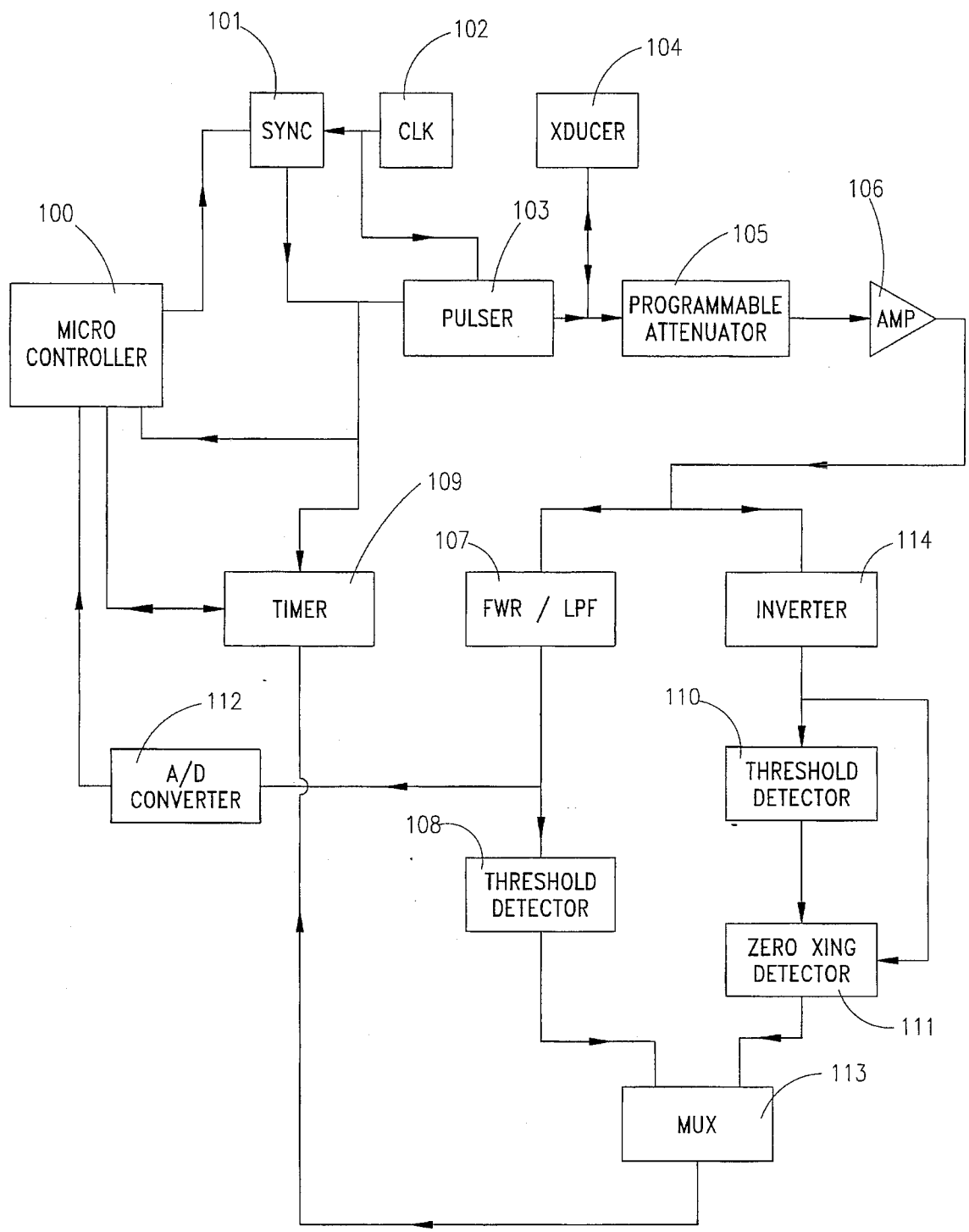
FIG. 9d is a block diagram illustrating the preferred composite operative relationship between the various electronic circuits to make the fluid volume and leak detection measurements.

Referring to FIG. 9a, three basic alternate ultrasonic ranging systems are illustrated: the electrical signals generated by transducer 104 can be transmitted directly to (1) ADC 112, (2) to DAC 105, or (3) to FWR/LPF 107. However, in each of these alternate embodiments of the invention, the electrical signals will ultimately be digitized by the ADC 112 in order for the signals to be analyzed by micro-controller 100 for the purpose of establishing the location of the leading edge of the primary echo envelopes.

In the first alternative method, electrical signals from transducer 104 are fed directly to ADC 112 to form corresponding digitized signals. The digitized electrical signals have been digitized into a specific number of bins wherein each bin represents the voltage level in a pre-set time period. For a 500 KHz digitization rate clock, each bin will represent the voltage level in a particular 2 μsec time period. The digitized signal is then scanned by micro-controller 100 to identify the first bin, $B_{fs}$, having a digitized signal greater than a pre-determined signal threshold voltage $V_1$. $V_1$ is selected to be less than the peak voltage in the primary echo packet associated with the fluid surface, but greater than the peak voltage in the primary echo packet associated with any of the calibration reflectors. In low resolution fluid volume determinations, bin $B_{fs}$ identifies the leading edge of the echo packet associated with the fluid surface and can be used to calculate in a known manner the TOF of the sound waves from transducer 104 to the fluid surface, and in turn calculate the fluid level using a given speed of sound in the fluid. From this calculation one can then use the calculated fluid level and the known geometry of tank cavity 8 to calculate in a known manner the fluid volume.

In the second alternate method the electrical signals from transducer 104 are amplitude adjusted by first being attenuated by DAC 105 in an amount set by the micro-controller 100 and/or then amplified by a fixed amount by amplifier 106. For purposes of this invention, the output of attenuator 105 is considered to correspond to an amplitude gain of 1. The amount of amplitude adjustment is preferably set so that the peak voltage associated with the fluid level echo packet will be in the upper range of the voltage scale being recorded by the electronic circuitry. This is typically about 5 volts. These adjusted electrical signals are then digitized by ADC 112 and scanned by micro-controller 100 to identify first bin $B_{fs}$ having a digitized signal greater than the pre-determined signal strength threshold $V_1$. The fluid volume can then be calculated as described above.

In a third alternate method the electrical signals from transducer 104 are first rectified and filtered by FWR/LPF 107 to form echo envelopes associated with the echo packets. These rectified/filtered signals are then fed to ADC 112 to produce corresponding digitized signals. As in each of the other two methods described these bins containing the digitized signals are scanned by micro-controller 100 to identify first bin $B_{fs}$ having a digitized signal greater than the pre-determined signal strength threshold $V_1$. The fluid volume can then be calculated as before.

In a more preferred embodiment, programmable attenuator 105, such as an eight bit digital-to-analog converter (DAC), and a fixed gain amplifier 106 provide the means to control the amplitude or strength of the electrical signals from transducer 104. In the case of a National Semiconductor Model DAC0830 DAC and an amplifier with a gain of 60, the overall adjustment to the amplitude or strength of the electrical signals is determined by:

$$ADJUSTMENT=(60 \times N)/256$$

where N is an integer in the range 0 to 255 and represents one of the possible setting of the 8 bit DAC. This DAC provides the wide range of control of the signal strength at the output of the amplifier 106 to obtain the desired signal discrimination between the primary echo packets.

The preferred low resolution measurements are made by first amplitude adjusting the electrical signals from transducer 104 through the use of DAC 105 and amplifier 106. The electrical signals adjusted for maximum attenuation are then rectified and filtered by FWR/LPF 107 before being digitized by ADC 112. The attenuated, rectified, filtered and digitized electrical signals are then scanned by micro-processor 100 to identify the bin $B_{fs}$ having a signal greater threshold voltage $V_1$. The volume measurement is then calculated as explained above.

Figure 10:
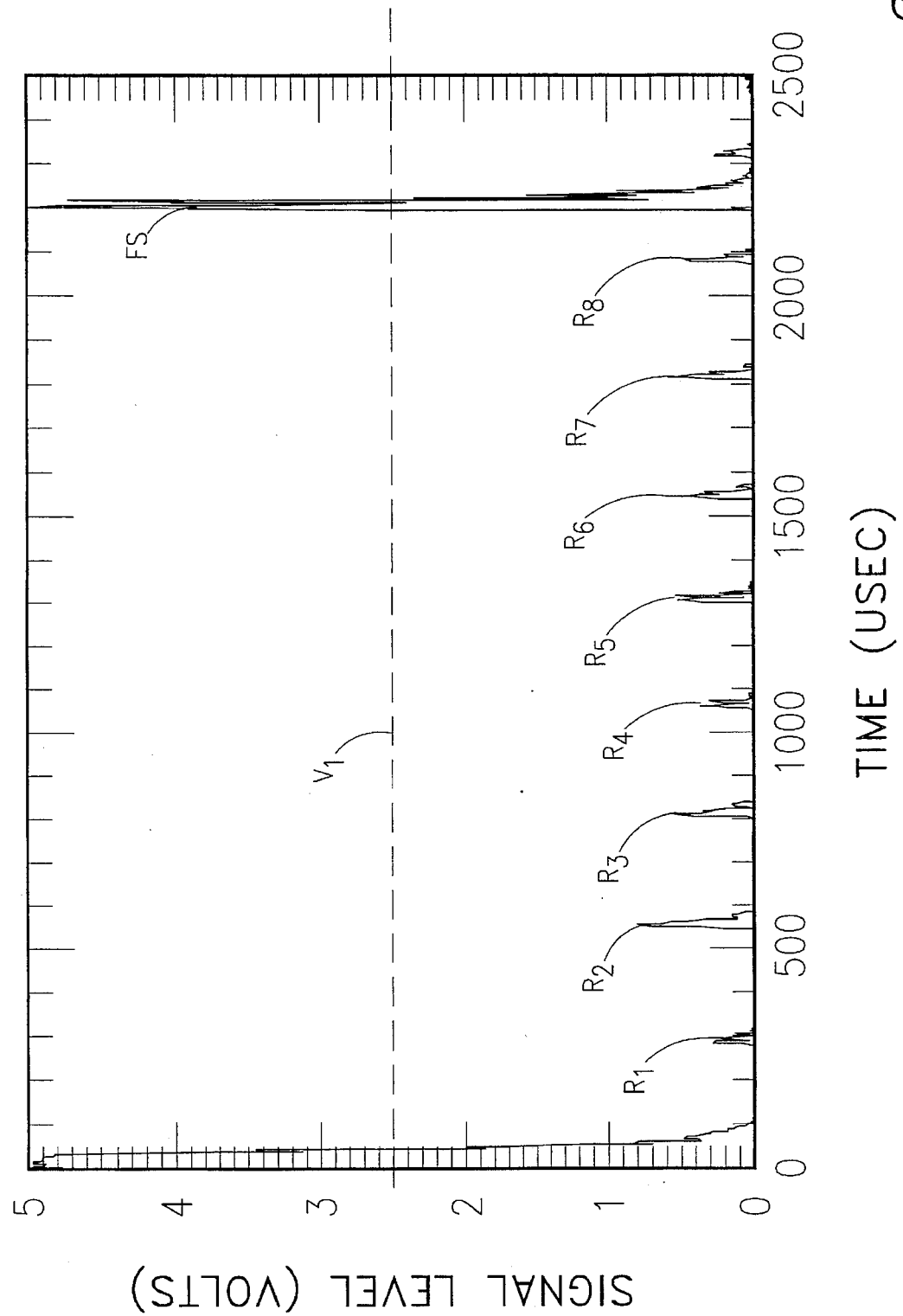
FIG. 10 is an example of the visual image of the primary and secondary echo envelopes that is obtained when the attentuator has been set to produce an output signal from the amplifier having minimum signal strength.

The digital data displayed in FIG. 10, which is acquired with attenuation set at a high level to provide a minimal signal level at the output of amplifier 106, is indicative of the degree of signal integrity and discrimination that can be achieved between the fluid surface echo envelope and the calibration reflector echo envelopes. In FIG. 10, the fluid surface is clearly shown as located between calibration reflectors $R_s$. To obtain this signal integrity and discrimination it is preferred that the calibration reflectors 25 be offset with respect to longitudinal axis 26 (See FIG. 8), and be vertically unequally spaced to provide a fluid interface echo strength to calibration reflector echo strength ratio of the order of 3 to 1, preferably 5 to 1. The amount of the vertical differences in spacing between the calibration reflectors should be set so that the secondary echo packet of a particular calibration reflector will be imbedded in the trailing edge of another calibration reflector. This positioning insures that the secondary echo envelopes do not interfere with the detection of the leading edge of the primary echo envelopes associated with calibration reflectors 25.

Figure 12:
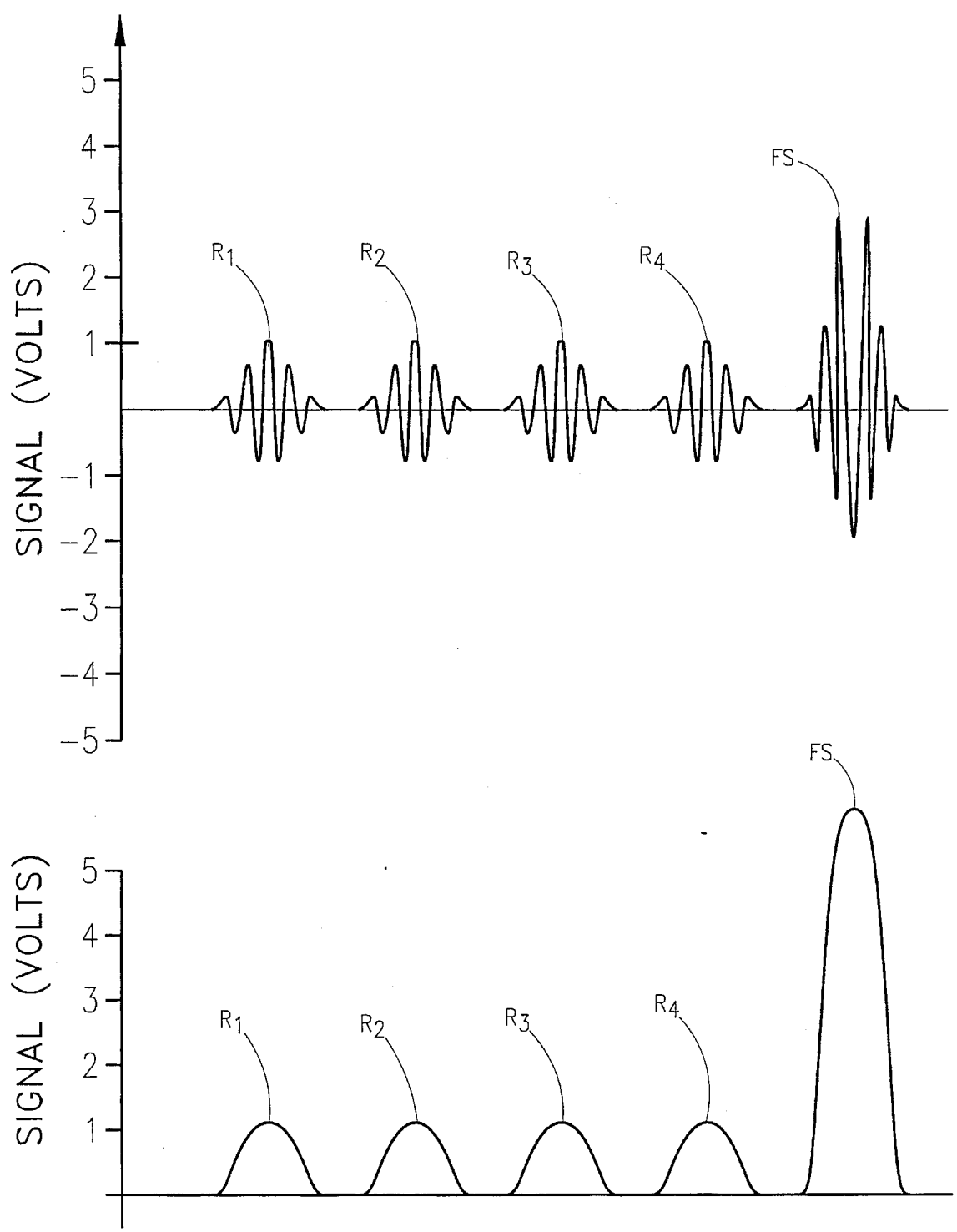
FIG. 12 is a graphical representation of the primary echo packet signals generated by the transducer and the corresponding echo envelope signals generated with the primary echo packet signals have been effected by the FWR/LPF.
Figure 13:
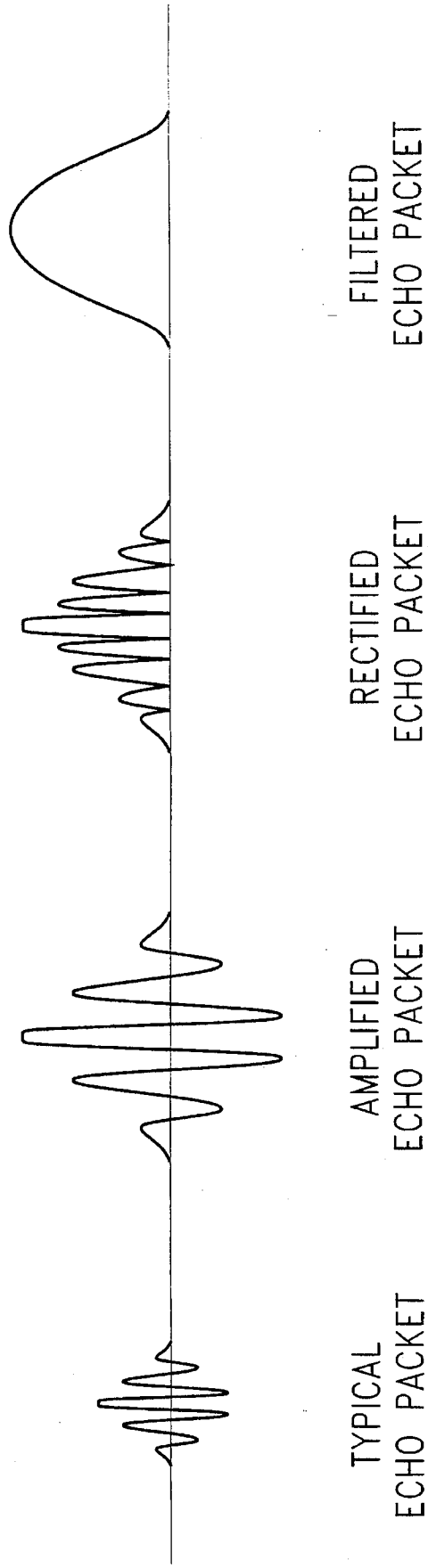
FIG. 13 is a graphical representation of the changes to an echo packet of ultrasonic signals reflected from a surface to form a corresponding envelope of fully rectified, filtered signals.

FIGS. 12 and 13 illustrate the changes made to the electrical signal from the transducer 104 to produce the primary echo envelope images shown in FIG. 10. More particularly, the top section of FIG. 12 illustrates a typical sinsoidual electrical signal generated by transducer 104 in a probe having four reflection reflectors. For purposes of simplicity, background noise and the effect of secondary echo packets are not shown. The bottom section of FIG. 12 represents the rectified and filtered electrical signal corresponding to the top section of FIG. 12. FIG. 13 illustrates the transformation an individual primary echo packet goes through during attenuation, rectification and filtration to form a primary echo envelope.

2. Preferred Resolution Measurement of Fluid Volume. As indicated above, the low resolution measurement method can be used to determine the approximate leading edge of the primary echo packets or primary echo envelopes associated with the fluid surface. It is now necessary to determine the approximate leading edge of at least the two submerged calibration reflectors nearest the fluid surface, and more preferably of each of the submerged calibration reflectors 25.

Figure 11:
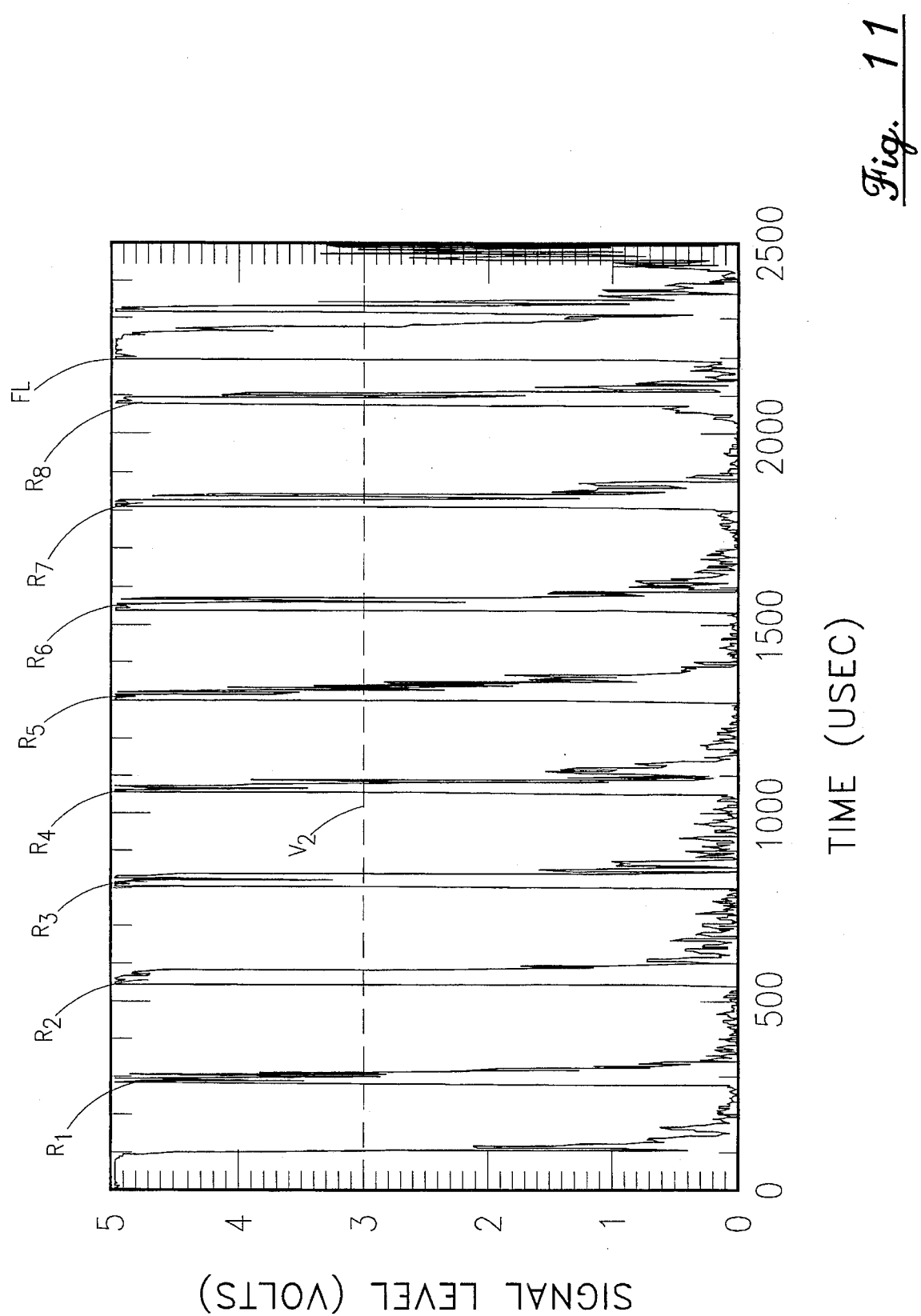
FIG. 11 is an example of the visual image of the primary and secondary echo envelopes that is obtained when the attentuator has been set to produce an output signal from the amplifier having a greater signal strength.

To obtain this calibration reflector information, the amount of attenuation by attentuator 105 is decreased, and a second firing of transducer 104 is made to generate a second set of electrical signals that are attenuated, rectified, filtered, and digitized in a similar manner as before to produce a series of primary echo envelopes such as seen in FIG. 11. The amount of amplitude adjustment by attentuator 105 and amplifier 106 is set so that the peak voltage in each of the primary echo packets associated with the submerged calibration reflectors approaches a given voltage above which has been clipped by the electronics of the system. Typically the signals are electronically clipped at 5 volts in this measurement. From the known $B_{fs}$ in the low resolution measurement, one can identify which primary echo envelope is associated with the fluid surface and know which primary echo envelopes are associated with the submerged calibration reflectors.

To identify the approximate leading edge of the primary echo envelopes associated with the submerged calibration reflectors, the digitized electrical signals from the second set of electrical signals, such as seen in FIG. 11, are scanned by micro-controller 100 to locate the first bin in each primary echo envelope associated with the submerged calibration reflectors. The first bin is defined as the first bin in the primary echo packet greater than a second pre-determined threshold voltage, $V_2$, which may be different from $V_1$. In a preferred embodiment, scanning is continued for at least three bins after the first detected bin having a voltage signal greater than $V_2$ to ensure that the first detected signal was not associated with an extraneous noise spike. Electronic circuitry which can provide such scanning is well known. This information, along with $B_{fs}$, is stored in micro-processor 100 and will be used to send enabling signals to threshold detector to enable threshold detector 108 to search for and identify electrical signals greater than a third threshold voltage $V_3$, which may be different from either $V_1$ or $V_2$.

Referring now to FIG. 8, one of the two submerged calibration reflectors (e.g., $R_7$) identified from the data received in the low resolution measurement step is selected. Micro-controller 100 signals timer 109 to reset itself to zero. Once timer 109 has been reset, the micro-controller 100 signals the synchronizer 101 to transmit a firing signal upon synchronization with the rising edge of a clock cycle to pulser 103, as well as to signal the start of timer 109. The pulser is fired and transducer 104 transmits the ultrasonic sound waves toward the various surfaces.

Micro-processor 100 has operatively decreased the amount of attenuation which attenuator 105 will effect on the electrical signals received from transducer 104. As in the preferred low resolution measurement method, the adjusted electrical signals are rectified and filtered by FWR/LPF 107 to produce the series of primary echo envelopes. More preferably, as seen in FIG. 11, the amount of attenuation will be set so that the anticipated peak strength signals in the primary echo envelopes associated with each of the submerged calibration reflectors will be approximately 5 volts.

Prior to the known estimated time when the leading edge of the primary echo packet from the selected calibration reflector should be detected by threshold detector 108, micro-processor 100, utilizing the bin information which it has stored, signals threshold detector 108 to begin scanning for a voltage greater than voltage threshold, $V_3$. When threshold detector 108 observes a signal greater than threshold voltage $V_3$, it signals timer 109 to stop. Micro-processor 100 reads and stores this time. These steps are repeated for the other submerged calibration reflector, $R_6$. For future reference, these steps could be repeated for all of the calibration reflectors, $R_1$ through $R_{11}$ in order to adjust by various known formulae the volume measurements to a standard temperature in order to obtain a temperature referenced corrected volume of the fluid in tank cavity 8. This same procedure could be used to determine the TOF of the leading edge associated with the fluid surface. However, when the fluid surface FS is near a calibration reflector the leading edge associated with the fluid surface FS may become imbedded in primary echo packet associated with the calibration reflector and not be detectable. Therefore, it is preferred that the leading edge associated with the fluid surface FS be determined by first decreasing the attenuation on attenuator 105 to a level to again be able to reproduce a signal similar to that seen in FIG. 10. Transducer 104 is again fired, and prior to the known estimated time when the leading edge of the primary echo packet associated with the fluid surface should be detected by threshold detector 108, micro-controller 100 utilizing the TOF information which it has stored, signals threshold detector 108 to begin scanning for a voltage threshold in the same range of magnitude as $V_2$. When threshold detector detects such a signal, it signals timer 109 to stop. Micro-processor 100 reads and stores this time which will be used as the TOF associated with the leading edge of fluid level, FS. In a preferred embodiment for a typical gasoline UST, threshold detector 108 is enabled to begin scanning at three bins (6 μsecs) before the anticipated detection of the leading edge, and is disabled after detection of the leading edge. This insures that the echo envelope from an adjacent calibration reflector 25 does not interfere with the detection of the desired echo envelope. Upon identification of a signal above the threshold voltage $V_2$, timer 109 is stopped and subsequently the threshold detection circuitry is disabled.

This third pre-determined voltage threshold $V_3$ will be set high enough to be well above the background noise and yet low enough to detect all of the primary echo envelopes of the calibration reflectors and the fluid surface. Each of the three bins so identified are selected to represent the TOF of the leading edge of the primary echo packets of the fluid surface and the two submerged calibration reflectors nearest the fluid surface.

With this information the distance from the tank bottom to the fluid surface, $D_{fs}$, can be more accurately determined by the following formula:

$$D_{fs} = \frac{(D_8 - D_7)}{(T_8 - T_7)} \times (T_{fs} - T_8) + D_8 + D_t$$

wherein $D_s$ is the known distance of the submerged calibration reflector closest to the fluid surface from the transducer, $D_7$ is the known distance of the submerged calibration reflector next closest to the fluid surface from the transducer, $D_t$ is the known distance from the tank bottom to the top of the transducer crystal, $T_{fs}$ is the determined TOF associated with the fluid surface, $T_s$ is the determined TOF associated with the submerged calibration reflector closest to the fluid surface, and $T_7$ is the determined TOF associated with the submerged calibration reflector next closest to the fluid surface.

This method takes into consideration the changes in velocity of sound in the liquid due to temperature or other factors, and because of the large number of calibration reflectors preferably used, provides an accurate measurement of the fluid volume in the tank cavity 8.

If there is a second fluid, such as water, in the bottom of the tank, then it is desirable that the fluid level of this second fluid, WS, be determined to more accurately determine the fluid volume in the tank cavity 8.

The depth of the water, $D_{ws}$ can be determined via the use of one of three equations, or weighted combinations of these three. When there is very little water in tank 7 (See FIG. 14), the primary echo envelope from the tank bottom overlaps with the primary echo envelope from the water surface and of the two timings, $T_b$ and $T_{ws}$, only $T_{ws}$, is measured. In this case, the depth of the water, $D_{ws}$, can be determined by the following formula:

$$D_{ws} = D_{r1} \times (T_{ws}/T_{r1}) + D_b$$

where $D_{r1}$ is the known distance to the first calibration reflector, $T_{ws}$ is the TOF of the leading edge of the primary echo envelope associated with the water surface, $T_{r1}$ is the TOF of the leading edge of the primary echo envelope associated with the first calibration reflector, and $D_b$ is the known distance from the tank bottom to the bottom of the transducer crystal.

Figure 15:
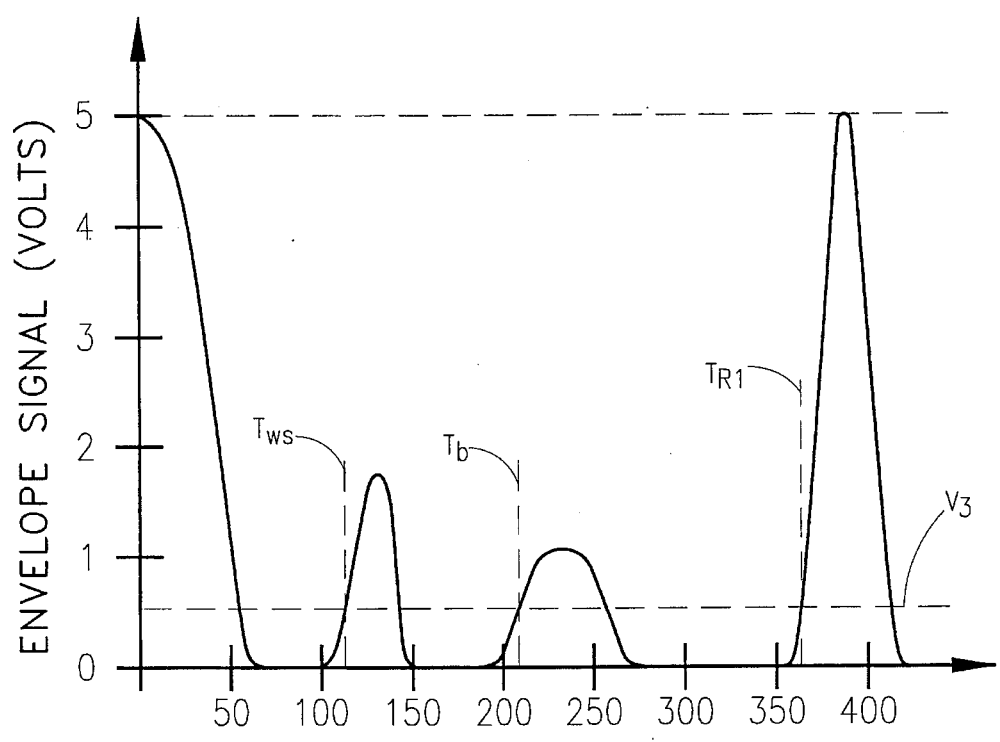
FIG. 15 is an illustration of the profile obtained from measuring the gasoline/water interface below the transducer when the primary echo envelopes associated with the water surface and the tank bottom can be clearly distinguished.

As the water level in the tank increases, the water surface primary echo envelope and the tank bottom primary echo envelope separate (See FIG. 15). Once the two primary echo envelopes are distinctly separated, the timings, $T_b$ and $T_{ws}$, can be made to both. $D_{ws}$ can then be determined by either the above formula or the following formula:

$$D_{ws} = (T_b - T_{ws})/2S_w$$

where $T_b$ is the measured TOF of the leading edge of the primary echo envelope associated with the tank bottom, $T_{ws}$ is the measured TOF of the leading edge of the primary echo envelope associated with the water surface, and $S_w$ is the known speed of sound in water.

As the water level continues to increase, the water surface primary echo envelope becomes imbedded in the trailing edge of the transducer firing pulse (See FIG. 16), and $T_{ws}$ is no longer measurable. In this case, the water level is given by:

$$D_{ws} = [D_{r1}(T_b/T_{r1}) - D_b]/[S_w T_{r1}/D_{r1} - 1].$$

Figure 14:
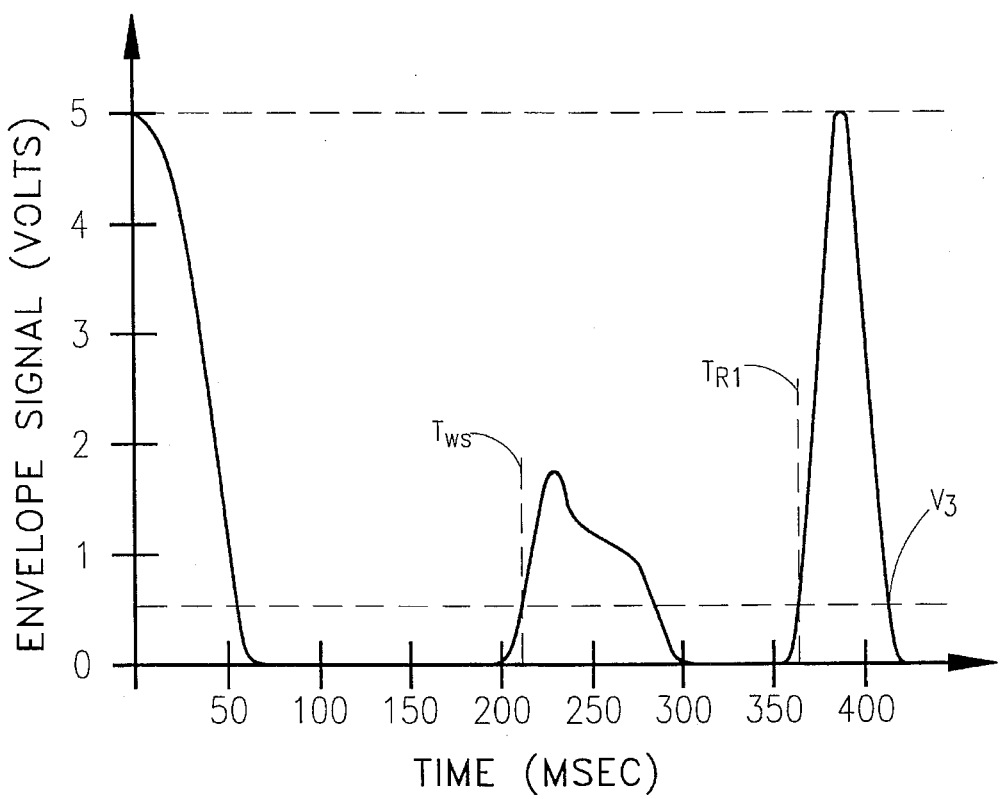
FIG. 14 is an illustration of the profile obtained from measuring the gasoline/water interface below the transducer when the primary echo envelope associated with the water surface is imbedded in the primary echo envelope associated with the tank bottom.
Figure 16:
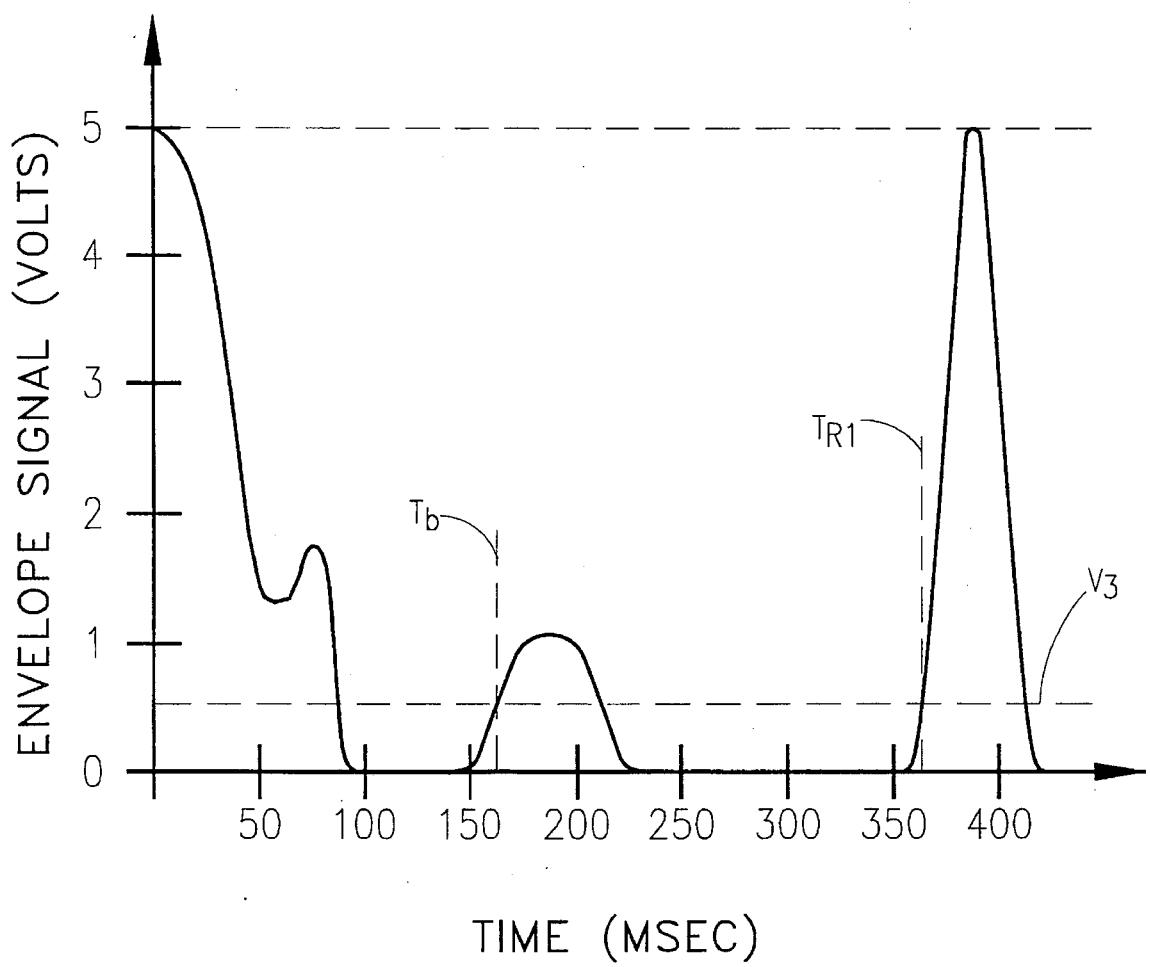
FIG. 16 is an illustration of the profile obtained from measuring the gasoline/water interface below the transducer when the primary echo envelope associated with the water surface is imbedded in the firing pulse envelope.

The primary echo envelope profiles depicted in FIGS. 14 and 16 are similar. However, they can be distinguished by the magnitude of their signal strengths. The primary echo envelope associated with the tank bottom can be diminished sufficiently by the use of the back ranging trap assembly 80.

3. Fluid Leak Detection Measurements. If leak detection measurements are desired, the timing will be made from measurements on the primary echo packet, and not the envelope signals. As in the medium resolution embodiment, micro-controller 100 has stored in its memory the estimated times of detection of the primary echo packets from each of the calibration reflectors, $R_1$ through $R_{11}$, and fluid level FS. In this embodiment, as in the medium resolution measurements, timer 109 is started by the signal from synchronizer 101 at the same time that pulser 103 receives its firing signal. The electrical signals associated with the sound waves detected by transducer 104 are amplitude adjusted by DAC 105 and amplifier 106. The adjusted signals are preferably electronically transmitted to inverter 114 wherein they may be inverted. Inversion of the adjusted electrical signals provides the means for minimizing cycle skipping when threshold detector 110 is searching for a threshold voltage greater than $V_3$.

Micro-controller 100 enables threshold detector 109 to begin scanning for a voltage greater than V, just before the time that the particular primary echo packet is estimated to be detected. Preferably, threshold detector 109 will be enabled about 6 μsec before arrival of the leading edge. Upon detection of such a voltage, threshold detector 100 enables zero crossing detector 111 to begin scanning the adjusted electrical signal for the next zero voltage reading. When the next zero crossing is observed, zero crossing detector 111, through multiplexer 113, signals timer 109 to stop timing. The micro-controller 100 reads and stores the time from the timer 109. This procedure is repeated for the two submerged calibration reflectors nearest the fluid level, and preferably for each of the submerged calibration reflectors in order to make temperature referenced corrected fluid volume measurements.

With the information thus recorded and the known geometry of the tank cavity 8, the fluid level, and in turn the fluid volume, can be calculated as in the medium resolution measurement method. If this procedure is repeated over time, the leakage rate of the fluid from tank cavity 8 can be measured. Leak detection is carried out during a period of time when no fluid is being dispensed from the tank cavity 8. In the calculation of leak detection, the measured fluid volume will be calibrated for a given temperature, generally 68° F., through use of known formulae from the measured TOFs to each of the submerged calibration reflectors.

There are of course other alternate embodiments that are obvious from the foregoing descriptions of the invention which are intended to be included within the scope of the invention as defined by the following claims.

What I claim is:

1. In an ultrasonic probe for use in an ultrasonic ranging system measuring the fluid level of a fluid in a cavity of a container, wherein said probe having an elongated member having a top end and a lower end, said elongated member vertically fixable to said container to position said lower end within said container cavity below said fluid level, at least one calibration reflector fixedly attached to said elongated member below said fluid level, a transducer assembly positioned a known distance from a bottom surface of said container forming said cavity, and between said lower end and all of said calibration reflectors for transmitting a packet of ultrasonic sound waves and for detecting primary and secondary echo packets reflected from each of said calibration reflectors and from said fluid level, the improvement to which comprises: each of said calibration reflectors positioned to cause its secondary echo packet to be imbedded in the trailing edge of a primary echo packet of another calibration reflector prior to a time when said transducer has detected a primary echo packet associated with said fluid level.

2. An ultrasonic probe according to claim 1 wherein the improvement to which further comprises: each of said calibration reflectors positioned offset from an axis extending perpendicularly and vertically from said transducer assembly.

3. An ultrasonic probe according to claim 2 wherein the improvement to which further comprises: an ultrasonic sound wave dampening member fixedly attached to said elongated member between said transducer assembly and said bottom surface, said wave dampening member having a trapping surface facing toward said transducer assembly, said trapping surface configured to trap sound waves striking said trapping surface before said sound waves are reflected from said trapping surface back toward said transducer assembly.

4. An ultrasonic probe according to claim 2 wherein the improvement to which further comprises: said transducer assembly comprising a transducer body in which is housed a piezoelectric crystal aligned with said axis, wherein said transducer body is structured to trap any ultrasonic sound waves which are outside an active radiating surface of said transducer body.

5. An ultrasonic probe according to claim 2 wherein the improvement to which further comprises: an ultrasonic sound wave dampening member fixedly attached to said elongated member between said transducer assembly and said bottom surface, said wave dampening member having a trapping surface facing toward said transducer assembly, said trapping surface configured to trap sound waves striking said trapping surface before said sound waves are reflected from said trapping surface back toward said transducer assembly, said transducer assembly comprising a transducer body in which is housed a piezoelectric crystal aligned with said axis, wherein said transducer body is structured to trap any ultrasonic sound waves which are outside an active radiating surface of said transducer body.

6. An ultrasonic probe according to claim 1 wherein the improvement to which further comprises: an ultrasonic sound wave dampening member fixedly attached to said elongated member between said transducer assembly and said bottom surface, said wave dampening member having a trapping surface facing toward said transducer assembly, said trapping surface configured to trap sound waves striking said trapping surface before said sound waves are reflected from said trapping surface back toward said transducer assembly.

7. An ultrasonic probe according to claim 6 wherein the improvement to which further comprises: said transducer assembly comprising a transducer body in which is housed a piezoelectric crystal aligned with said axis, wherein said transducer body is structured to trap any ultrasonic sound waves which are outside an active radiating surface of said transducer body.

8. An ultrasonic probe according to claim 1 wherein the improvement to which further comprises: said transducer assembly comprising a transducer body in which is housed a piezoelectric crystal aligned with said axis, wherein said transducer body is structured to trap any ultrasonic sound waves which are outside an active radiating surface of said transducer body.

9. In an ultrasonic probe for use in an ultrasonic ranging system measuring the fluid level of a fluid in a tank cavity of known dimensions formed by walls having ceiling, sides and floor sections, wherein said probe having an elongated body provided with a passageway whose longitudinal axis extends from a top end of said elongated body to a lower end of said elongated body, said elongated body vertically fixable to position said bottom end within said tank cavity below said fluid level, at least one calibration reflector fixedly positioned in said elongated body below said fluid level, a transducer assembly positioned a known distance from a bottom surface of said tank cavity between said lower end and each of said calibration reflectors for transmitting a packet of ultrasonic sound waves within said body and for detecting primary and secondary echo packets reflected from each of said calibration reflectors and from said fluid level, the improvement to which comprises: each of said calibration reflectors positioned offset from an axis extending perpendicularly and vertically from said transducer assembly.

10. An ultrasonic probe according to claim 9 wherein the improvement to which further comprises: an ultrasonic sound wave dampening member fixedly attached to said elongated member between said transducer assembly and said bottom surface, said wave dampening member having a trapping surface facing toward said transducer assembly, said trapping surface configured to trap sound waves striking said trapping surface before said sound waves are reflected from said trapping surface back toward said transducer assembly.

11. An ultrasonic probe according to claim 9 wherein the improvement to which further comprises: said transducer assembly comprising a transducer body in which is housed a piezoelectric crystal aligned with said axis, wherein said transducer body is structured to trap any ultrasonic sound waves which are outside an active radiating surface of said transducer body.

12. An ultrasonic probe according to claim 9 wherein the improvement to which further comprises: an ultrasonic sound wave dampening member fixedly attached to said elongated member between said transducer assembly and said bottom surface, said wave dampening member having a trapping surface facing toward said transducer assembly, said trapping surface configured to trap sound waves striking said trapping surface before said sound waves are reflected from said trapping surface back toward said transducer assembly, said transducer assembly comprising a transducer body in which is housed a piezoelectric crystal aligned with said axis, wherein said transducer body is structured to trap any ultrasonic sound waves which are outside an active radiating surface of said transducer body.

13. In an ultrasonic probe for use in an ultrasonic ranging system measuring the fluid level of a fluid in a tank cavity of known dimensions formed by walls having ceiling, sides and floor sections, wherein said probe having an elongated body provided with a passageway whose longitudinal axis extends from a top end of said elongated body to a lower end of said elongated body, said elongated body vertically fixable to position said bottom end within said tank cavity below said fluid level, at least one calibration reflector fixedly positioned in said elongated body below said fluid level, a transducer assembly positioned a known distance from said floor section between said lower end and each of said calibration reflectors for transmitting a packet of ultrasonic sound waves within said body and for detecting primary and secondary echo packets reflected from each of said calibration reflectors and from said fluid level, the improvement to which comprises: an ultrasonic sound wave dampening member fixedly attached to said elongated member between said transducer assembly and said bottom surface, said wave dampening member having a trapping surface spaced apart from and facing toward said transducer assembly, said trapping surface configured to trap sound waves striking said trapping surface before said sound waves are reflected from said trapping surface back toward said transducer assembly.

14. An ultrasonic probe according to claim 13 wherein the improvement to which further comprises: said transducer assembly comprising a transducer body in which is housed a piezoelectric crystal aligned with said axis, wherein said transducer body is structured to trap any ultrasonic sound waves which are outside an active radiating surface of said transducer body.

15. In an ultrasonic probe for use in an ultrasonic ranging system measuring the fluid level of a fluid in a tank cavity of known dimensions formed by walls having ceiling, sides and floor sections, wherein said probe having an elongated body provided with a passageway whose longitudinal axis extends from a top end of said elongated body to a lower end of said elongated body, said elongated body vertically fixable to position said bottom end within said tank cavity adjacent said floor section, at least one calibration reflector fixedly positioned in said elongated body below said fluid level, a transducer assembly positioned a known distance from said floor section between said lower end and each of said calibration reflectors for transmitting a packet of ultrasonic sound waves within said body and for detecting primary and secondary echo packets reflected from each of said calibration reflectors and from said fluid level, the improvement to which comprises: said transducer assembly comprising a transducer body in which is housed a piezoelectric crystal aligned with said axis, wherein said transducer body is structured to trap any ultrasonic sound waves traveling in a given direction which are outside an active radiating surface of said transducer body and to propagate any sound waves traveling in said given direction which are inside said active radiating surface.

16. An ultrasonic probe according to claims 1, 2, 3, 4, 5, 6, 7, or 8 wherein there are two or more calibration reflectors positioned in the bottom half of said container cavity, and wherein those calibration reflectors positioned in said bottom half are vertically unequally spaced from one another.

17. An ultrasonic probe according to claims 1, 2, 3, 4, 5, 6, 7, 8, 9, 10, 11, 12, 13, 14 or 15 wherein there are two or more calibration reflectors, each of said calibration reflectors sized and fixably attached to said elongated member to reflect said packet in a manner to produce primary echo packets whose peak strengths are approximately equal when detected by said transducer.

18. An ultrasonic probe according to claims 3, 5, 6, 7, 10, 12, 13, or 14 wherein said surface of said ultrasonic sound dampening means is formed by a series of concentric rings of ridges.

19. An ultrasonic probe according to claims 3, 5, 6, 7, 10, 12, 13, or 14 wherein said ultrasonic sound dampening means is constructed from material that is chemically stable in said fluid.

20. An ultrasonic probe according to claims 4, 5, 7, 8, 11, 12, 14, or 15 wherein said transducer body is configured to form a partial cone shaped configuration cavity having a flat surface facing said bottom surface.

21. In an ultrasonic probe for use in an ultrasonic ranging system measuring the fluid level of a fluid in a cavity of a container, wherein said probe having an elongated member having a top end and a lower end, said elongated member vertically fixable to said container to position said lower end within said container cavity below said fluid level, at least one calibration reflector fixedly attached to said elongated member below said fluid level, a transducer assembly positioned a known distance from a bottom surface of said container forming said cavity, and between said lower end and all of said calibration reflectors for transmitting a packet of ultrasonic sound waves and for detecting primary and secondary echo packets reflected from each of said calibration reflectors and from said fluid level, the improvement to which comprises: said transducer assembly including a transducer capable of directing an ultrasonic sound wave both to said fluid surface and to said bottom surface of said container.

22. An ultrasonic probe according to claim 21, wherein said transducer is capable of simultaneously directing an ultrasonic sound wave both to said fluid surface and said bottom surface of said container.

* * * * *